(12) United States Patent
Kodama et al.

(10) Patent No.: US 8,449,019 B2
(45) Date of Patent: May 28, 2013

(54) VEHICLE INTERIOR FINISHING LAMINATE SHEET, PROCESS FOR PRODUCING THE SAME, AND APPARATUS THEREFOR

(75) Inventors: Akira Kodama, Tochigi (JP); Hiroshi Yoshida, Tochigi (JP); Takahiro Shimizu, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 642 days.

(21) Appl. No.: 12/526,309

(22) PCT Filed: Feb. 8, 2008

(86) PCT No.: PCT/JP2008/052163
§ 371 (c)(1),
(2), (4) Date: Aug. 7, 2009

(87) PCT Pub. No.: WO2008/096860
PCT Pub. Date: Aug. 14, 2008

(65) Prior Publication Data
US 2011/0008565 A1    Jan. 13, 2011

(30) Foreign Application Priority Data

Feb. 9, 2007    (JP) .................. 2007-030265
Dec. 28, 2007   (JP) .................. 2007-340010
Dec. 28, 2007   (JP) .................. 2007-340011

(51) Int. Cl.
| | | |
|---|---|---|
| B60K 37/00 | (2006.01) |
| B60N 2/00 | (2006.01) |
| B60N 3/00 | (2006.01) |
| B60J 7/00 | (2006.01) |
| B62D 25/06 | (2006.01) |
| B32B 3/26 | (2006.01) |
| B32B 5/18 | (2006.01) |
| B32B 3/02 | (2006.01) |
| B32B 3/14 | (2006.01) |
| B32B 27/00 | (2006.01) |
| B32B 37/00 | (2006.01) |
| C08J 9/32 | (2006.01) |

(52) U.S. Cl.
USPC ...... 296/187.02; 296/210; 428/159; 428/162; 428/304.4; 428/308.4; 428/309.9; 428/33; 428/45; 428/47; 428/53; 428/57; 428/36.5; 427/244; 523/218; 264/171.23; 264/171.28; 264/173.19

(58) Field of Classification Search
USPC ................ 428/33, 44, 45, 47, 53, 54, 55, 56, 428/57, 58, 59, 60, 62, 157, 158, 159, 160, 428/161, 162, 304.4, 308.4, 309.9, 310.5; 296/39.3, 187.01, 187.02, 187.03, 187.05, 296/187.06, 210, 211, 214, 216.01, 218, 296/219, 222, 224, 216.09
See application file for complete search history.

(56) References Cited

U.S. PATENT DOCUMENTS
3,856,614 A * 12/1974 Susuki et al. ................. 428/212
(Continued)

FOREIGN PATENT DOCUMENTS
JP    51-047066    4/1976
(Continued)

Primary Examiner — David Sample
Assistant Examiner — Nicole T Gugliotta
(74) Attorney, Agent, or Firm — Schiff Hardin LLP

(57) ABSTRACT

There are provided a vehicle interior finishing laminate sheet in which a polypropylene resin foam board of high foaming extent having interconnected cells is used as a core member, a vehicle interior trim material, a method for manufacturing the vehicle interior finishing laminate sheet, and an apparatus therefor. The present invention relates to a vehicle interior finishing laminate sheet 1 provided with a core member consisting of a polypropylene resin foam board 2. The polypropylene resin foam board 2 is extrusion molded into a plate shape, and has an interconnected cell ratio of 50% or higher and a foaming extent of 10- to 50-fold. A plurality of polypropylene resin foam boards 2, 2 are joined to each other by the hot plate welding method or the laser transmission welding method, whereby a large-size core member of vehicle interior finishing laminate sheet 1, which is used for a roof lining or the like, can be formed.

12 Claims, 14 Drawing Sheets

U.S. PATENT DOCUMENTS

| | | | |
|---|---|---|---|
| 3,902,943 A | 9/1975 | Debliek | |
| 5,348,778 A * | 9/1994 | Knipp et al. | 428/35.8 |
| 6,153,144 A * | 11/2000 | Byma | 264/511 |
| 6,541,105 B1 * | 4/2003 | Park | 428/304.4 |
| 2001/0042935 A1 * | 11/2001 | Barber et al. | 264/46.4 |
| 2003/0026968 A1 * | 2/2003 | Kojima | 428/292.1 |
| 2003/0044580 A1 * | 3/2003 | Gorowlcz et al. | 428/172 |
| 2004/0075299 A1 * | 4/2004 | Wieber et al. | 296/187.02 |
| 2011/0021650 A1 * | 1/2011 | Itadani et al. | 521/79 |

FOREIGN PATENT DOCUMENTS

| | | | |
|---|---|---|---|
| JP | S51112018 | | 10/1976 |
| JP | S52121675 | | 10/1977 |
| JP | S62142092 | | 6/1987 |
| JP | H0839710 | | 2/1996 |
| JP | 10-338082 | | 12/1998 |
| JP | 2000-006729 | | 1/2000 |
| JP | 2003-034192 | | 2/2003 |
| JP | 2003112354 | | 4/2003 |
| JP | 2004500998 | | 1/2004 |
| JP | 2005515086 | | 5/2005 |
| JP | 2005199891 | | 7/2005 |
| JP | 2006-045356 | * | 2/2006 |
| WO | 0170861 | | 9/2001 |
| WO | 03059619 | | 7/2003 |
| WO | WO 2007/034978 | | 3/2007 |
| WO | WO 2009/035111 | * | 5/2010 |

* cited by examiner

S2·S3:LAMINATING STEP (a)

(b)

(c)

(d)

(a)

(b)

(a)

(b)

VEHICLE INTERIOR FINISHING LAMINATE SHEET, PROCESS FOR PRODUCING THE SAME, AND APPARATUS THEREFOR

TECHNICAL FIELD

The present invention relates to a vehicle interior finishing laminate sheet, a vehicle interior trim material, a method for manufacturing the vehicle interior finishing laminate sheet, and an apparatus therefor. More particularly, it relates to a vehicle interior finishing laminate sheet using a polypropylene resin foam board of high foaming extent having interconnected cells, a vehicle interior trim material, a method for manufacturing the vehicle interior finishing laminate sheet, and an apparatus therefor.

BACKGROUND ART

Conventionally, on the indoor side of a roof panel for a vehicle and the like, a vehicle roof material formed of a synthetic resin or the like is disposed to achieve heat insulation and sound absorption, and the indoor side of this vehicle roof material is covered with a cover material. As a vehicle interior finishing laminate sheet forming such a vehicle roof material, there has been proposed a laminate sheet in which on one surface of a modified polyphenylene ether resin foam sheet having an interconnected cell ratio of 50% or higher, a hole part opened to the surface is formed, and a surface sheet formed of a nonwoven fabric consisting of a form retaining fiber and a thermoplastic resin fabric is laminatedly integrated on at least a hole part forming surface (for example, refer to Patent Document 1, cited below).

The vehicle interior finishing laminate sheet described in Patent Document 1 has the modified polyphenylene ether resin foam sheet having an interconnected cell ratio of 50% or higher, and contains a large number of interconnected cells continuous with the adjacent cells. Therefore, a sound from the outside intrudes into and is absorbed by the modified polyphenylene ether resin foam sheet, so that a high sound absorption effect can be achieved. Also, the vibration energy of the sound is smoothly induced into the interconnected cells of the modified polyphenylene ether resin foam sheet through the hole part, and the cell wall of interconnected cell is vibrated. Thereby, the vibration energy is converted to heat energy, and excellent sound absorption properties can be achieved.

Patent Document 1: Japanese Unexamined Patent Application Publication No. 2005-199891.

PROBLEMS TO BE SOLVED

Unfortunately, the vehicle interior finishing laminate sheet described in Patent Document 1 has a problem in that since the modified polyphenylene ether resin is used as the material for the foam board, the raw material cost of the laminate sheet goes up. Therefore, there has been a demand for development of a vehicle interior finishing laminate sheet provided with a polypropylene resin foam board having interconnected cells, which are formed of a general-purpose resin excellent in terms of cost. In particular, among the general-purpose resins, polypropylene is thermally stable, has high heat resisting properties and heat insulating properties, and also has excellent mechanical properties. Therefore, there has been a demand for development of a vehicle interior finishing laminate sheet, such as a vehicle roof material, provided with a polypropylene resin foam board having interconnected cells, which are formed of polypropylene. However, it has been known that it is technically difficult to obtain a foam having interconnected cells from polypropylene. As the vehicle interior finishing laminate sheet used as a vehicle roof material using a polypropylene foam sheet, only the laminate sheet having independent cells has been known, and the vehicle interior finishing laminate sheet used as a vehicle roof material provided with a foam sheet having interconnected cells, which is formed of polypropylene, has not been known. In the existing vehicle interior finishing laminate sheet used as a vehicle roof material using a foam sheet having independent cells, which are formed of polypropylene, the sound absorption properties have been incapable of being enhanced because the cells thereof are independent cells. Furthermore, in the existing vehicle interior finishing laminate sheet used as a vehicle roof material using a foam sheet having independent cells, which is formed of polypropylene, it is difficult to reduce the weight because it is difficult to make the foaming extent 15-fold or higher. Also, it has been difficult to obtain a polypropylene resin foam board formed of polypropylene, having interconnected cells and formed into a board size, which is used for a core member of the roof material.

The laminate sheet described herein has been made in view of the above circumstances, and accordingly an object thereof is to provide a vehicle interior finishing laminate sheet in which a polypropylene resin foam board of high foaming extent having interconnected cells, a vehicle interior trim material such as a roof material (roof lining), a method for manufacturing the vehicle interior finishing laminate sheet, and an apparatus therefor. Another object is to provide a vehicle interior finishing laminate sheet that has high sound absorption properties despite of being polypropylene resin, and at the same time, has a sufficient rigidity though being light in weight, a vehicle interior trim material, a method for manufacturing the vehicle interior finishing laminate sheet, and an apparatus therefor.

SOLUTIONS OF THE PROBLEMS

To solve the above problems, in a vehicle interior finishing laminate sheet provided with a polypropylene resin foam board, the polypropylene resin foam board is extrusion molded into a plate shape, and has an interconnected cell ratio of 50% or higher and a foaming extent of 10- to 50-fold. By this configuration, a lightweight vehicle interior finishing laminate sheet having high sound absorption properties and rigidity can be obtained by using a polypropylene resin, which is a general-purpose resin. That is to say, since the foam board has interconnected cells despite a polypropylene resin, the sound absorption properties are high and the foaming extent is also high, so that a light weight can be achieved. If the foaming extent is higher than 50-fold, a rigidity necessary for the use as a vehicle roof material cannot be obtained. If the foaming extent is lower than 10-fold, a light weight necessary for the use as a vehicle roof material cannot be obtained. Also, if the interconnected cell ratio is lower than 50%, sufficient sound absorption properties cannot be obtained.

Also, as described in claim 2, the foaming extent is preferably 30- to 35-fold. By making the foaming extent 35-fold or lower, a lightweight vehicle interior finishing laminate sheet having high sound absorption properties and rigidity consisting of a polypropylene resin, which is a general-purpose resin, can be obtained more surely. Also, by making the foaming extent 30-fold or higher, a light weight of the lightweight vehicle interior finishing laminate sheet having high sound absorption properties and rigidity consisting of a polypropylene resin, which is a general-purpose resin, can be achieved more surely. Also, as described in claim 3, the polypropylene resin foam board may be formed with a skin layer on both surfaces thereof. By this configuration, a slicing step performed after the foam board has been obtained by extrusion foaming can be omitted.

Also, a sheet-shaped reinforcing material may be provided on both surfaces of the polypropylene resin foam board. By this configuration, the rigidity of the vehicle interior finishing laminate sheet provided with a polypropylene resin foam board of high foaming extent can further be enhanced.

To solve the above problems, the core member is formed by welding the end parts of the thickness side of a plurality of polypropylene resin foam boards each consisting of a plate body having a predetermined thickness, and the welding is performed by buttedly joining the polypropylene resin foam boards melted by being brought into contact with a heated metal plate. As described above, the core member of the vehicle interior finishing laminate sheet is formed by joining the plurality of polypropylene resin foam boards having high sound absorption properties by thermal welding using a heated metal plate. Therefore, a vehicle interior finishing laminate sheet of any size using the polypropylene resin foam boards that have high sound absorption properties and are light in weight can be obtained. As a result, a lightweight vehicle roof lining having high sound absorption properties and rigidity consisting of a polypropylene resin, which is a general-purpose resin, can be obtained.

Specifically, it is preferable that the vehicle interior finishing laminate sheet consist of the core member formed by joining the polypropylene resin foam boards formed with a concave part in the corner part of a joint surface disposed on the indoor side on the opposed joint surfaces of the polypropylene resin foam boards. Since the polypropylene resin foam boards formed with a concave part in the corner part of the opposed joint surfaces are joined as described above, the joint part hardened by melting as compared with the surrounding part can be prevented from appearing as a convex projection on the surface in the subsequent laminating step or at the time of thermoforming. As a result, convex surface roughness can be prevented from occurring on the design surface (indoor-side surface) of the vehicle interior finishing laminate sheet or the roof lining.

To solve the above problems, the core member consists of a plate body having a predetermined thickness, and is formed by joining the end parts on the thickness side or the surfaces in the thickness direction of the plurality of polypropylene resin foam boards having a predetermined thickness by using a joint part, and the joint part of the core member has a plane-shaped hardened layer that is heated by the absorption of a laser beam. As described above, the core member of the vehicle interior finishing laminate sheet is formed by joining the end parts or the surfaces in the thickness direction of the plurality of polypropylene resin foam boards having high sound absorption properties by using the joint part. Therefore, a vehicle interior finishing laminate sheet of any size using lightweight polypropylene resin foam boards having high sound absorption properties can be obtained. As a result, a lightweight vehicle roof lining having high sound absorption properties and rigidity consisting of a polypropylene resin, which is a general-purpose resin, can be obtained. Also, since laser transmission welding is performed, the joint part has the plane-shaped hardened layer that is heated by the absorption of a laser beam.

Specifically, the core member is preferably formed by joining the plurality of polypropylene resin foam boards having a different foaming extent and consisting of the plate body having a predetermined thickness. Further specifically, the core member is preferably configured so that the foaming extent of the polypropylene resin foam board disposed on the side end part side is lower than that of the polypropylene resin foam board disposed on the center side. Also, it is preferable that the core member be formed with an opening part, and the foaming extent of the polypropylene resin foam board disposed on the frame part side of the opening part be lower than that of the polypropylene resin foam board disposed in any other part. Furthermore, it is preferable that the core member be formed by joining the plurality of polypropylene resin foam boards, each consisting of the plate body having a predetermined thickness, in the thickness direction, and the foaming extent of the polypropylene resin foam board disposed on the indoor side be lower than that of the polypropylene resin foam board disposed on the outdoor side. By this configuration, the polypropylene resin foam board of low foaming extent having a high strength can be disposed in a part requiring strength, such as an attachment part to a vehicle body or the surroundings of the opening part. As a result, a vehicle interior finishing laminate sheet or a roof lining using a lightweight polypropylene resin foam board having high sound absorption properties and rigidity can be obtained.

Also, the core member is preferably formed by joining the polypropylene resin foam boards formed with undulation engaging with each other on the opposed joint faces. The polypropylene resin foam boards formed with a curved surface engaging with each other on the opposed joint faces as described above can be joined firmly by welding the joint faces of the polypropylene foam boards by being heated using a laser beam, so that the joint strength of joint face can be improved.

To solve the above problems, a method for manufacturing the vehicle interior finishing laminate sheet provided with the polypropylene resin foam board includes a kneading step in which a polypropylene resin, a core forming material, and a volatile gas foaming agent are supplied to an extruder, and a resin mixture melted in the extruder is kneaded at high temperature and pressure; an extruding step in which the resin mixture is extruded under low pressure by using a die provided at the outlet of the extruder and having a slit substantially rectangular in cross section, and is extrusion foamed substantially into a plate shape; a cooling step in which the extrusion foamed resin mixture is brought into contact with a cooling sizer, which is connected to the die, and has a slit having a cross section larger than that of the slit of the die and formed substantially into a rectangular shape, and is cooled and solidified while being drawn, by which the substantially plate-shaped polypropylene resin foam board is obtained; and a laminating step in which a sheet-shaped reinforcing material is laminated on the polypropylene resin foam board to obtain the vehicle interior finishing laminate sheet. By this configuration, a foam board of high foaming extent having interconnected cells can be obtained by using a polypropylene resin that has conventionally been impossible to use. As a result, a lightweight vehicle interior finishing laminate sheet having high sound absorption properties and rigidity consisting of a polypropylene resin, which is a general-purpose resin, can be obtained. Also, due to gas foam molding using a volatile gas as a foaming agent, high-extent foaming, which is impossible in chemical form molding using a chemical decomposition type foaming agent, can be performed. Therefore, a foam board of high foaming extent having a foaming extent of 10- to 50-fold can be obtained, so that a lightweight vehicle interior finishing laminate sheet can be obtained.

Also, the kneading step may be performed by keeping the temperature of the resin mixture near the outlet of the extruder at 154 to 157 C, and the extruding step may be performed by keeping the temperature in the slit of the die at 154 to 157 C and the pressure in the slit of the die at 30 kg/cm$^2$ or higher. By this configuration, the extruding step can be performed in a stable molding viscosity region other than a viscosity region in which the cells are unstable and a viscosity region in which solidification occurs in the die or the extruder and the pressure and torque increase. Also, since the pressure in the slit of the die is kept at 30 kg/cm$^2$ or higher, the melted resin mixture can be prevented from foaming in the die.

To solve the above problems, a joining step of joining the polypropylene resin foam boards to each other is provided between the cooling step and the laminating step, and in the joining step, the side end parts of the plurality of polypropylene resin foam boards melted by the contact with a heated metal plate are buttedly welded to each other.

By this configuration, a large-size core member can be obtained by joining the polypropylene resin foam boards of high foaming extent having interconnected cells by thermal welding using a heated metal plate. As a result, a vehicle interior finishing laminate sheet that is also usable for a lightweight roof lining having high sound absorption properties and rigidity consisting of a polypropylene resin, which is a general-purpose resin, can be obtained.

To solve the above problems, a joining step of joining the polypropylene resin foam boards to each other is provided between the cooling step and the laminating step, and in the joining step, a heat generating agent for generating heat when absorbing a laser beam is applied to faces to be joined of the butted polypropylene resin foam boards, and the heat generating agent is heated by the laser beam penetrating the polypropylene resin foam board, by which the joint faces of the side end parts of the polypropylene resin foam boards are melted and joined.

By this configuration, a large-size core member can be obtained by joining the polypropylene resin foam boards of high foaming extent having interconnected cells by thermal welding using a laser beam. As a result, a vehicle interior finishing laminate sheet that is also usable for a lightweight roof lining having high sound absorption properties and rigidity consisting of a polypropylene resin, which is a general-purpose resin, can be obtained.

Also, it is preferable that in the joining step, the polypropylene resin foam boards to be joined be welded in a state of being pressed by a regulating member, and the regulating member be formed of a transparent acrylic resin. Thus, a laser beam can be applied to the joint faces of the polypropylene resin foam boards to be joined in the state in which the foam boards are pressed by the regulating member. Therefore, a shift of joint position in the joining step can be restrained.

To solve the above problems, an apparatus for manufacturing the vehicle interior finishing laminate sheet provided with the polypropylene resin foam board includes an extruder for kneading a melted polypropylene resin mixture at high temperature and pressure; a die connected to the outlet of the extruder to send out the melted resin mixture under low pressure and to foam it; and a cooling sizer connected to the die to cool the foamed resin mixture to obtain the polypropylene resin foam board, and is characterized in that the die and the cooling sizer each are provided with a slit substantially rectangular in cross section, and the slits are connected to each other to form a passage of the polypropylene resin foam board leading from the die to the cooling sizer; and the slit of the cooling sizer is formed so as to have a larger cross section than the slit of the die. By this configuration, the polypropylene resin foam board can be extrusion foamed substantially into a plate shape, and a foam board of high foaming extent having interconnected cells can be obtained by using a polypropylene resin that has conventionally been impossible to use. As a result, a lightweight vehicle interior finishing laminate sheet having high sound absorption properties and rigidity consisting of a polypropylene resin, which is a general-purpose resin, can be obtained. Also, since a sizer method is used in which the foamed resin is caused to pass through the cooling sizer that regulates the upper, lower, right and left sides to obtain a plate-shaped foam board, a foam board of high foaming extent having a large thickness, which cannot be manufactured by the mandrel method in which a cylindrical board is made and a part thereof is cut with a cutter or the like to obtain a plate-shaped board, can be obtained. Therefore, a lightweight vehicle interior finishing laminate sheet having high rigidity can be obtained.

ADVANTAGES

A lightweight vehicle interior finishing laminate sheet having high sound absorption properties and rigidity can be obtained by using a polypropylene resin, which is a general-purpose resin. The rigidity and light weight of the lightweight vehicle interior finishing laminate sheet having high sound absorption properties and rigidity consisting of a polypropylene resin, which is a general-purpose resin, can be secured. A subsequent step performed after the foam board has been obtained can be omitted, so that the manufacturing process is made easy. The rigidity of the vehicle interior finishing laminate sheet provided with the polypropylene resin foam board of high foaming extent can further be enhanced.

A vehicle interior finishing laminate sheet of any size using the polypropylene resin foam boards that have high sound absorption properties and are light in weight can be obtained. As a result, a lightweight roof lining having high sound absorption properties and rigidity consisting of a polypropylene resin, which is a general-purpose resin, can be obtained. Convex surface roughness can be prevented from occurring on the design surface of the vehicle interior finishing laminate sheet or the roof lining. A vehicle interior finishing laminate sheet of any size using the lightweight polypropylene resin foam boards having high sound absorption properties can be obtained. As a result, a lightweight roof lining having high sound absorption properties and rigidity consisting of a polypropylene resin, which is a general-purpose resin, can be obtained. The polypropylene resin foam board of low foaming extent having a high strength can be disposed in a part requiring strength, such as the attachment part to a vehicle body or the surroundings of the opening part. The joint faces of the polypropylene resin foam boards can be joined firmly to each other, so that the joint strength of joint face can be improved.

A foam board of high foaming extent having interconnected cells can be obtained by using a polypropylene resin that has conventionally been impossible to use. As a result, a lightweight vehicle interior finishing laminate sheet having high sound absorption properties and rigidity consisting of a polypropylene resin, which is a general-purpose resin, can be obtained. An extruding step can be performed in a stable molding viscosity region other than a viscosity region in which the cells are unstable and a viscosity region in which solidification occurs in the die or the extruder and the pressure and torque increase. Also, the melted resin mixture can be prevented from foaming in the die. A large-size core member can be obtained. As a result, a vehicle interior finishing laminate sheet that is also usable for a lightweight roof lining having high sound absorption properties and rigidity consisting of a polypropylene resin, which is a general-purpose resin, can be obtained. A shift of joint position in the joining step can be restrained. The polypropylene resin foam board can be extrusion foamed substantially into a plate shape, and a foam board of high foaming extent having interconnected cells can be obtained by using a polypropylene resin that has conventionally been impossible to use. As a result, a lightweight vehicle interior finishing laminate sheet having high sound absorption properties and rigidity consisting of a polypropylene resin, which is a general-purpose resin, can be obtained. Also, a foam board of high foaming extent having a large thickness, which cannot be manufactured by the mandrel method in which a cylindrical board is made and a part thereof is cut with a cutter or the like to obtain a plate-shaped board, can be obtained. Therefore, a lightweight vehicle interior finishing laminate sheet having high rigidity can be obtained.

DESCRIPTION OF SYMBOLS

| | |
|---|---|
| 1 | vehicle interior finishing laminate sheet |
| 2 | foam board |
| 2a | foam board of high foaming extent |
| 2b | foam board of low foaming extent |
| 3, 4 | reinforcing material |
| 5, 6 | bonding layer |
| 7 | cover material-side bonding layer |
| 10 | heating plate |
| 12 | pressing plate |
| 12a | upper pressing plate |
| 12b | lower pressing plate |
| 18 | opening part |
| 21 | tandem protruding machine |
| 22 | die |
| 23 | cooling sizer |
| 24 | take-off unit |
| 25 | laminator |
| 30, 35, 40, 45, 130, 150, 155 | roof lining core member |
| 110 | laser light source |
| 111 | laser beam |
| 112 | pressing plate |
| 113 | colored agent |
| 15, 115 | fused layer |
| 116 | extending part |

BEST MODE FOR CARRYING OUT THE INVENTION

Embodiments of the present invention will now be described with reference to the accompanying drawings. The configurations explained below do not restrict the present invention, and needless to say, can be changed variously based on the teachings of the present invention.

First Embodiment

Figure 1:
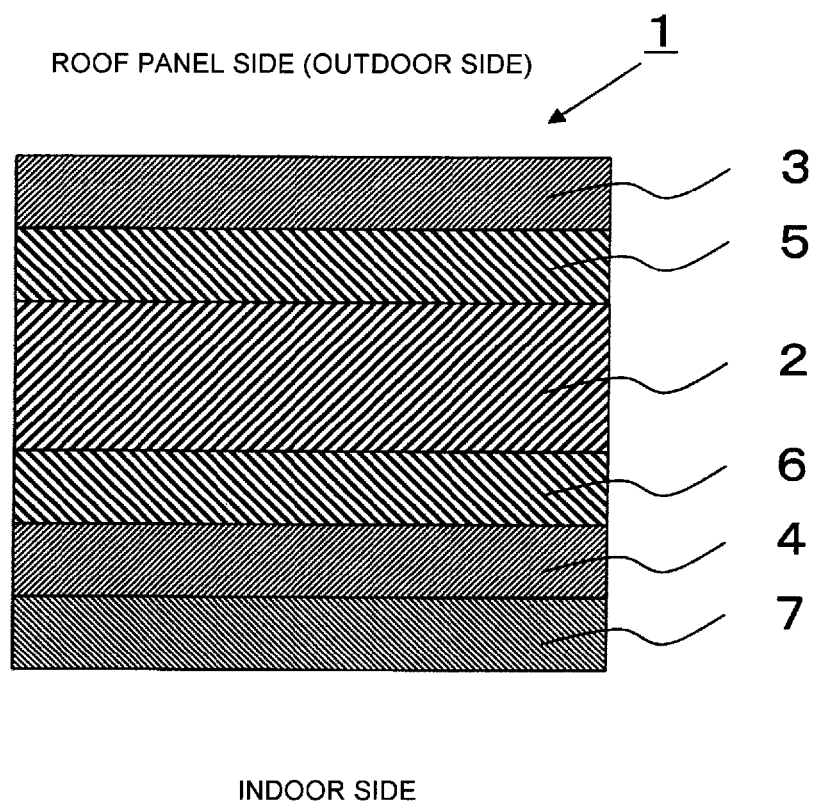
FIG. 1 is a longitudinal sectional view of a vehicle interior finishing laminate sheet in accordance with a first embodiment.
Figure 2:
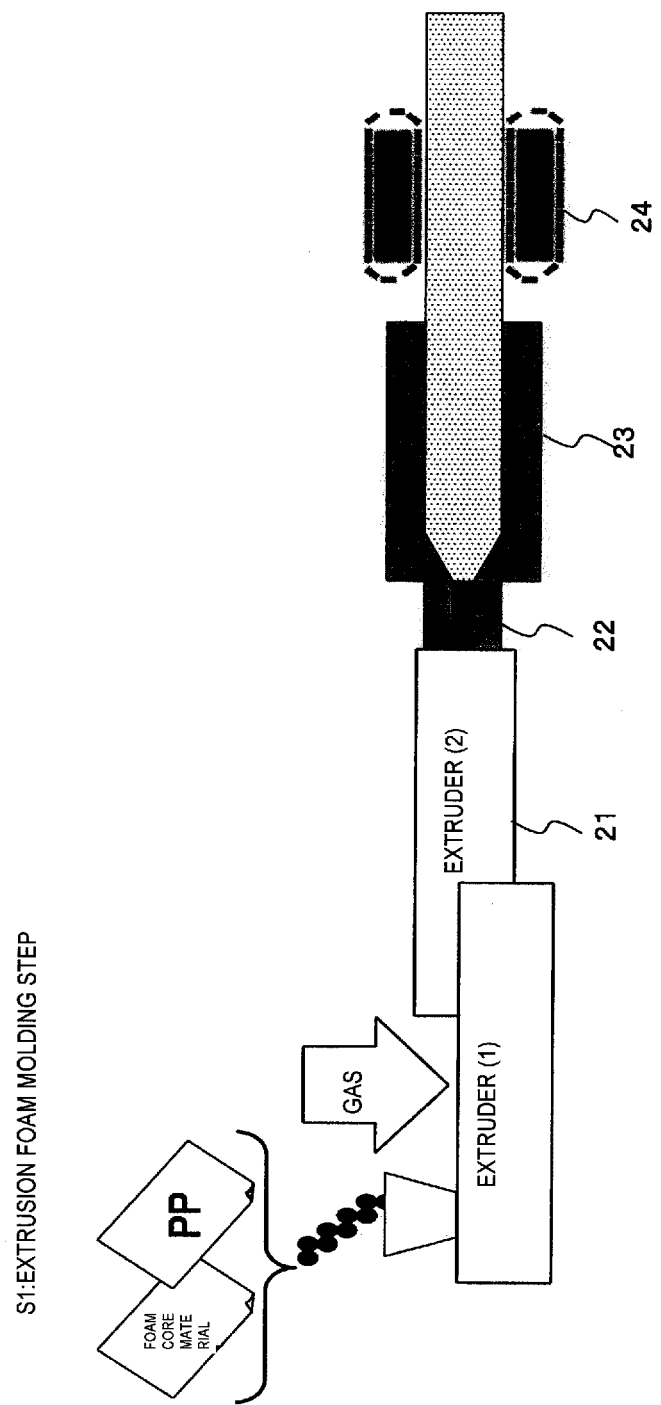
FIG. 2 is an explanatory view showing a flow of an extrusion foam molding step of a manufacturing process for a vehicle interior finishing laminate sheet in accordance with a first embodiment.
Figure 3:
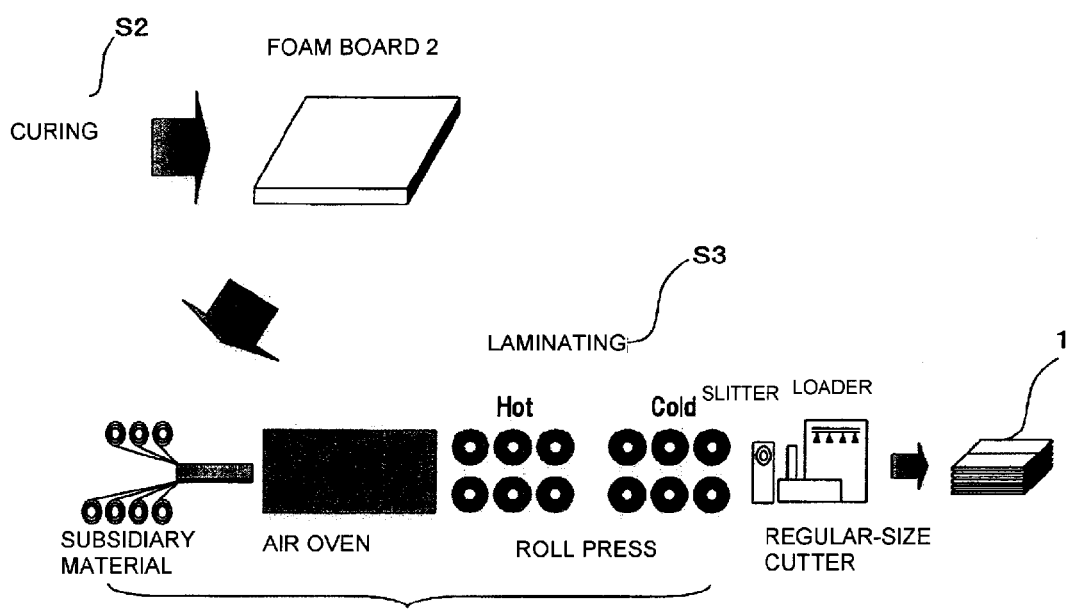
FIG. 3 is an explanatory view showing a flow of a laminating step of a manufacturing process for a vehicle interior finishing laminate sheet in accordance with a first embodiment.
Figure 4:
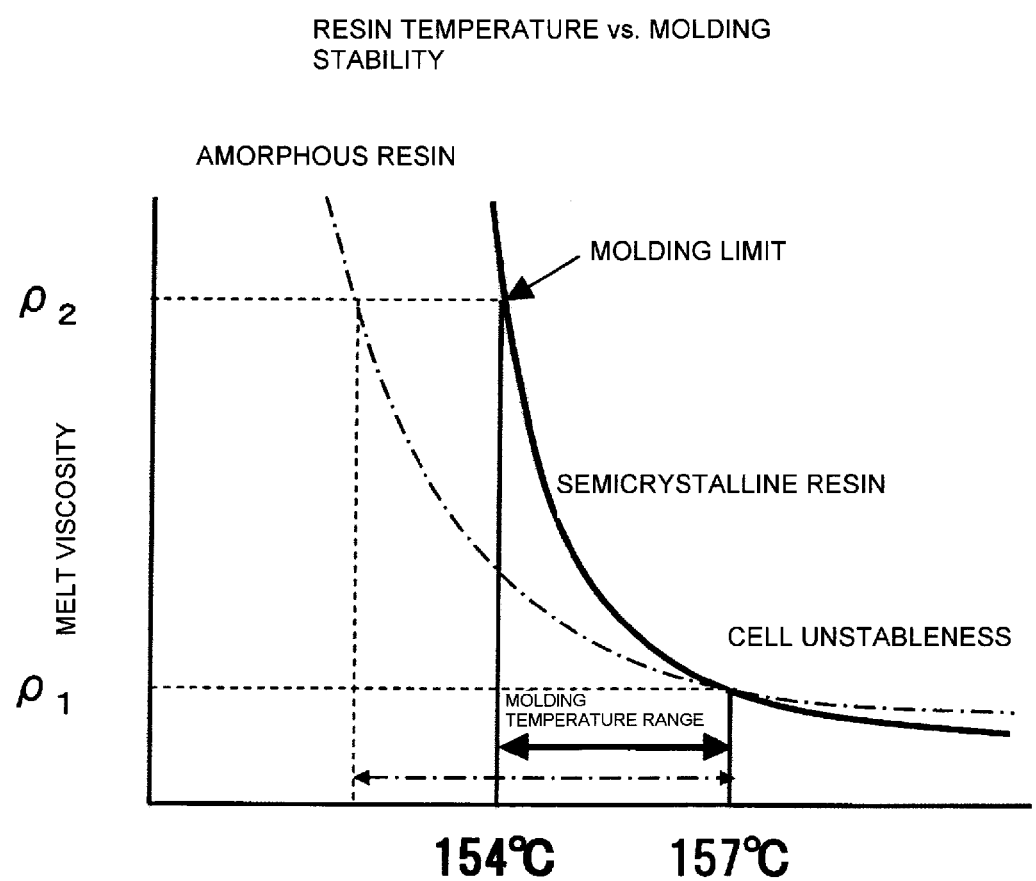
FIG. 4 is a graph showing the relationship between resin temperature and molding stability.
Figure 5:
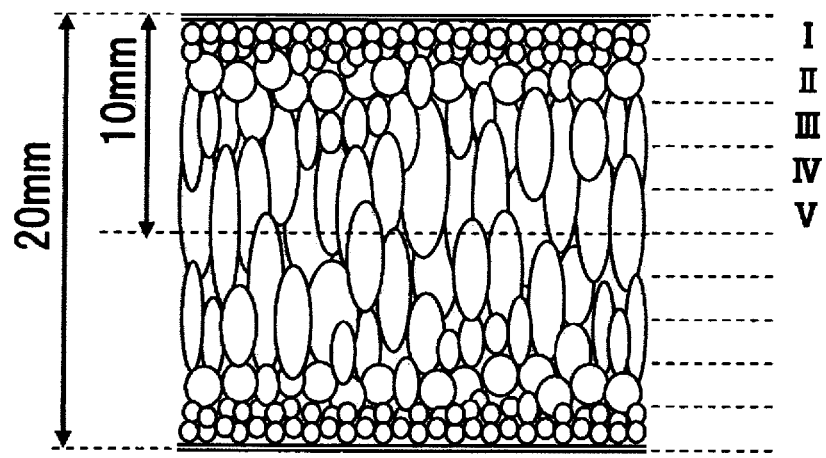
FIG. 5 is an explanatory view showing a method for cutting out test pieces for the measurement of interconnected cell ratio of a foam board.

FIGS. 1 to 5 relate to a first embodiment. FIG. 1 is a longitudinal sectional view of a vehicle interior finishing laminate sheet, FIG. 2 is an explanatory view showing a flow of an extrusion foam molding step of a manufacturing process for a vehicle interior finishing laminate sheet, FIG. 3 is an explanatory view showing a flow of a laminating step of the manufacturing process for the vehicle interior finishing laminate sheet, FIG. 4 is a graph showing the relationship between resin temperature and molding stability, and FIG. 5 is an explanatory view showing a method for cutting out test pieces for the measurement of interconnected cell ratio of a foam board.

This embodiment relates to the vehicle interior finishing laminate sheet, a vehicle interior trim material, and a method for manufacturing the vehicle interior finishing laminate sheet. In this embodiment, explanation is given of a roof material (roof lining) disposed on the surface on the indoor side of a vehicle roof panel as a vehicle interior trim material. However, this embodiment can be not only applied to the roof material but also applied similarly to a sound absorbing material in a trunk room, an engine room etc., a sound absorbing material of a door member, and the like.

As shown in FIG. 1, a vehicle interior finishing laminate sheet 1 of this embodiment is a laminated body formed by laminating a polypropylene resin foam board 2 (hereinafter, referred to as a foam board 2) formed of a polypropylene resin, reinforcing materials 3 and 4 laminated on the indoor side and the roof panel side (outdoor side), respectively, of the foam board 2, bonding layers 5 and 6 for bonding the reinforcing materials 3 and 4 to the foam board 2, and a cover material-side bonding layer 7 for bonding these elements to a cover material, not shown. The foam board 2 is a substantially flat plate shaped foam produced by extrusion molding using a gas foaming process using a core forming material and a volatile gas foaming agent with a non-crosslinked polypropylene resin being used as a base material, and a sizer process using an extruder. The foam board 2 is in a state in which a skin layer formed at the time of extrusion foaming is provided on both surfaces thereof. As described above, the foam board 2 is used as a core member of the vehicle interior finishing laminate sheet 1 formed by laminating the reinforcing materials 3 and 4 and the like.

As a polypropylene resin used for the foam board 2 of this embodiment, a non-crosslinked polypropylene resin is used. This resin is a propylene homopolymer or a propylene-olefin copolymer containing 50 wt % or more propylene polymerization unit. The olefin other than propylene, which is copolymerized with propylene, is not subject to any special restriction. However, an olefin having a carbon number of 2 to 12 is preferably used. Specifically, ethylene, 1-butene, 1-pentene, 1-hexene, 1-octene, 1-decene, 4-methyl-1-pentene, 3-methyl-1-pentene, and the like can be cited. These olefins may be of not only one kind but also two kinds.

As the non-crosslinked polypropylene resin of this embodiment, a polypropylene resin having a low melt flow rate and a high melting tension as compared with the average polypropylene resin is used. Also, regarding the strain hardening properties, a polypropylene resin exhibiting a phenomenon in which the resin is elongated in a molten state, and the viscosity rises suddenly just before the cutting (strain hardening phenomenon) is preferable. Further, a polypropylene resin having semi-crystallization time of a degree such that crystallization begins until the highest viscosity of foamed resin is reached is preferably used. These physical properties are measured by a publicly known measurement method described in Japanese Unexamined Patent Application Publication No. 2006-45356.

As the core forming material, talc, a sodium bicarbonate-based foaming agent, a citric acid-based foaming agent, or the like is used. Also, as the volatile gas foaming agent, n-butane, isobutane, pentane, or the like suitable for high-extent foaming is used. This is because inorganic gas such as nitrogen and carbon dioxide is unsuitable for the manufacture of a high-extent foam board because it has low solubility in polypropylene though having excellent compatibility with environment. In particular, in this embodiment, since foaming of high extent of 10-fold or higher is performed, n-butane or isobutane having high solubility in polypropylene is preferably used. Propane and pentane also have high solubility in polypropylene, but have an odor and are expensive.

The foam board 2 has an interconnected cell ratio of 50 to 98%, preferably 70% or higher, and a foaming extent of 10- to 50-fold, preferably 30- to 35-fold. Also, the thickness thereof immediately after foaming is 4 to 20 mm, preferably 12 to 16 mm, and further preferably 12 to 14 mm. The independent cell means a cell that is entirely surrounded by a cell wall, and does not communicate with any other cell. The interconnected cell means all cells other than the independent cells. Specifically, it means a cell that is formed with a through hole in the cell wall, and communicates with other cells through this through hole. The interconnected cell ratio of the foam board 2 is measured in conformity with ASTM D2856-87.

The reinforcing material 3, 4 is formed of a nonwoven fabric, a span bond of 100% polyester, a glass fiber, a carbon fiber, a basalt fiber, a natural fiber, an organic fiber, or the like. Also, the bonding layer 5, 6 and the cover material-side bonding layer 7 each are formed of a layer bonded to polypropylene with a hot melt film of olefin thermoplastic resin. Furthermore, for example, in the case of being used for a vehicle roof, the vehicle interior finishing laminate sheet 1 of this embodiment is produced by laminating a cover material consisting of a nonwoven fabric, a woven fabric, a stitched fabric, or the like, not shown, on the surface opposite to the reinforcing material 4 of the cover material-side bonding layer 7, by heating the laminate sheet in the laminated state, and subsequently by forming it into a desired shape by a cold press, and thereby is used as a vehicle roof material, which is one example of a vehicle interior trim material.

Next, an apparatus for manufacturing the vehicle interior finishing laminate sheet 1 configured as described above is explained with reference to FIGS. 2 and 3. As shown in FIGS. 2 and 3, the apparatus for manufacturing the vehicle interior finishing laminate sheet 1 includes a publicly known parallel tandem type tandem extruder 21, a die 22, a cooling sizer 23 for cooling the foam board 2, a publicly known take-off unit 24, and a publicly known laminator 25 for laminating the bonding layers 5 and 6 and the reinforcing materials 3 and 4 on the foam board 2. The die 22 is fixedly connected to an outlet through which a molded material at the rear end of the tandem extruder 21 is extruded. As shown in FIG. 2, in the die 22, a long slit having a rectangular slit cross section for connecting the outlet of the tandem extruder 21 to the slit of the cooling sizer 23 is formed. Also, there is provided the publicly known laminator 25 for laminating the bonding layers 5 and 6 and the reinforcing materials 3 and 4 on the foam board 2 as shown in FIG. 3.

The cooling sizer 23 is fixedly connected to the end part of the die 22. As shown in FIG. 2, in the cooling sizer 23, a long slit having a rectangular slit cross section one end part of which communicates with the slit of the die 22 and the other end part of which is open is formed. Thereby, the foam board 2 foamed in the die 22 is smoothly induced to the cooling sizer 23, by which the foam board 2 can be formed into a plate shape having a foaming extent of 10- to 50-fold, preferably 30- to 35-fold, and a thickness immediately after foaming of 4 to 20 mm, preferably 12 to 16 mm, and further preferably 12 to 14 mm.

Next, a method for manufacturing the vehicle interior finishing laminate sheet 1 configured as described above is explained with reference to FIGS. 2 and 3. First, as shown in FIG. 2, an extrusion foam molding step is performed in Step S1. In this step, first, a kneading step of kneading a resin mixture is performed in the tandem extruder 21. Specifically, the non-crosslinked polypropylene resin and the core forming material are supplied from a hopper to a first-stage extruder of the tandem extruder 21, and the resin is melted. A volatile gas in a liquefied gas state is supplied to the molten resin in the first-stage extruder under a pressure of 100 to 200 $kg/cm^2$. After the resin has been melted, and the molten resin and the volatile gas have been kneaded and mixed with each other in the first-stage extruder, this mixture is sent to a second-stage extruder to further perform kneading. In the second-stage extruder, the temperature of the resin mixture is uniformized to 154 to 157 C to adjust the viscosity of the resin mixture to a proper value, and the volatile gas is dispersed in the resin mixture.

Next, an extruding step of sending the resin mixture to the die 22 connected to the rear end opening of the tandem extruder 21 is performed. For the die 22, the temperature in the slit is kept at 154 to 157 C, which is the same as the resin temperature, and the pressure therein is kept at 30 $kg/cm^2$ or higher. The reason why the pressure is kept at 30 $kg/cm^2$ or higher is that the molten resin is foamed in the die 22 if the pressure is lower than 30 $kg/cm^2$. Thus, the resin mixture is sent into the slit of the die 22, and is pushed out of the die 22 and is foamed under a low pressure. The resin mixture is foamed at the moment when it goes out of the die 22. Thereafter, a cooling step of cooling and solidifying the resin mixture is performed. The foamed resin mixture goes to the cooling sizer 23, wherein the upper and lower sides and the right-hand and left-hand sides of the resin mixture come into contact with the slit inner wall of the cooling sizer 23. Thereby, the resin mixture is cooled and solidified into a plate-shaped body, by which the foam board 2 is molded. The foam board 2 is extrudedly foamed so that the thickness thereof is 4 to 20 mm, preferably 12 to 16 mm, and further preferably 12 to 14 mm, and becomes in a state in which a skin layer is formed on both surfaces thereof.

Although the foam board 2 can be molded so that the width thereof is in the range of 50 to 450 mm, the range of width is preferably from 400 to 450 mm. However, by exchanging the die 22, the foam board 2 having a shape other than the above-described one can also be formed. Thereafter, the foam board 2 is taken off successively by the take-off unit 24. The foam board 2, which is taken off by the take-off unit 24 and is cooled and solidified, is cut to a length of a predetermined unit by a publicly known procedure, and is cured (Step S2).

Next, a laminating step of Steps S2 and S3 is performed. The cooled and solidified foam board 2 is cut to a length of a predetermined unit by a publicly known procedure, and is cured (Step S2). In the laminating step of Step S3, subsidiary materials including the reinforcing materials 3 and 4, the bonding layers 5 and 6, and the cover material-side bonding layer 7 are laminated on both surfaces of the foam board 2 on both surfaces of which the skin layer is formed, and the laminated body is heated to a temperature higher than the melting point of the bonding layers 5 and 6 in an air oven. Subsequently, by compressing and cooling it by using a hot press and a cold press, a laminated body constituting the vehicle interior finishing laminate sheet 1 is obtained. In the laminating step, the foam board 2 having been formed so as to have a thickness of 10 to 20 mm, preferably 12 to 14 mm, is compressed so that the thickness thereof decreases to two-thirds to three-fourths the original thickness. In this embodiment, the foam board 2 having a thickness of 12 to 14 mm is compressed so that the thickness thereof is 8 mm. In the laminating step, since the subsidiary materials are laminated on the foam board 2 on both surfaces of which the skin layer is formed, a slice step can be omitted. Next, the laminated body is cut to a predetermined size by a slitter and a regular-size cutter to obtain the vehicle interior finishing laminate sheet 1, by which the manufacturing process for the vehicle interior finishing laminate sheet 1 is finished. After the manufacturing process for the vehicle interior finishing laminate sheet 1, a cover material, not shown, is laminated on the surface opposite to the reinforcing material 4 of the cover material-side bonding layer 7, and the laminated body is thermoformed into a desired shape by a publicly known method, by which a vehicle interior trim material can be obtained.

In the manufacturing method of this embodiment, in the extrusion foam molding step of Step S1, the temperature of resin in the second-stage extruder is kept at 154 to 157 C. FIG. 4 is a graph showing the relationship between resin temperature and molding stability. As indicated by the solid-line curve in FIG. 4, the cells of the resin become unstable at a viscosity of 1 or lower, and the resin solidifies in the die 22 and the tandem extruder 21 at a viscosity of 2 or higher, so that the pressure and torque increase, and therefore the operation of the tandem extruder 21 becomes impossible. In the case of semicrystalline polypropylene, when the resin temperature is 154 C, the viscosity is 2, and when the resin temperature is 157 C, the viscosity is 1. Therefore, in this embodiment, the temperature of resin in the second-stage extruder is kept at 154 to 157 C. The stable molding temperature of the polypropylene resin of this embodiment is 155 C 1.5 C. Also, since polypropylene flows at temperatures not lower than the melting point, the cell wall is solidified and stabilized immediately after the extrusion foaming. To obtain a foam having a high forming extent of 10-fold or higher, the resin mixture must be extruded at a temperature close to the melting point.

Next, the vehicle interior finishing laminate sheet of this embodiment is explained in more detail with reference to examples.

Example 1

The foam board 2 with a double-surface skin having a thickness of 12 to 14 mm and a foaming extent of 30- to 35-fold was obtained by performing the extrusion foam molding step S1 shown in FIG. 2. As the reinforcing materials 3 and 4, a span bond (polyethylene/polyethylene terephthalate, 23 g/m$^2$) was used, as the bonding layers 5 and 6, a hot melt film of olefin thermoplastic resin was used, and as the cover material-side bonding layer 7, a hot melt film was used. By the laminating step S2 and S3 shown in FIG. 3, the foam board 2 was compressed so that the thickness of the general surface thereof becomes 8 mm, and thereby the vehicle interior finishing laminate sheet 1 shown in FIG. 1 was obtained. In this vehicle interior finishing laminate sheet 1, the total of weight of layers of the subsidiary materials, that is, the reinforcing materials 3 and 4, the bonding layers 5 and 6, and the cover material-side bonding layer 7 was 136 g/m$^2$.

On the vehicle interior finishing laminate sheet 1 obtained in this example, the sound absorption properties and the rigidity were measured by publicly known methods, and the measured values were compared with predetermined target values. Also, as an index representing the production efficiency, raw material purchase costs for the vehicle interior finishing laminate sheet 1 were calculated, and the calculated value was compared with the predetermined target value. Regarding the sound absorption properties, the laminate sheet 1 formed by a foam board having a thickness of 12 mm or larger met the standard. Regarding the rigidity, the laminate sheet 1 formed by a foam board having a foaming extent of 35-fold or lower met the standard. As the result, the foam board having a foaming extent of 30-fold and a thickness of 12 mm and the foam board having a foaming extent of 35-fold and a thickness of 12 to 14 mm met the standard in terms of all factors of the light weight, sound absorption properties, and rigidity of the vehicle interior finishing laminate sheet 1. Also, regarding the production efficiency, considering the production efficiency as the quality of the vehicle interior finishing laminate sheet 1, the foam board having a foaming extent of 35-fold and a thickness of 12 mm was excellent in terms of all factors of the light weight, sound absorption properties, rigidity, and production efficiency of the vehicle interior finishing laminate sheet 1.

Example 2

In example 2, the foam board 2 was manufactured by the same method as that of example 1 except that the thickness thereof immediately after foaming performed in the extrusion foam molding step S1 was 20 mm. This foam board 2 was sliced at intervals of 2 mm from the skin layer as shown in FIG. 5 to obtain test pieces I to V, and the interconnected cell ratio of each test piece was measured. The interconnected cell ratios and the foaming extents of the test pieces are given in Table 1.

TABLE 1

| Test Piece | Interconnected cell ratio | Foaming extent |
| --- | --- | --- |
| I | 60.17 | 18.97 |
| II | 94.36 | 28.89 |
| III | 96.30 | 32.46 |
| IV | 96.89 | 32.84 |
| V | 96.03 | 30.51 |

From Table 1, it was found that the average of the interconnected cell ratios of the foam board 2 of this example is 88.75%, the average of the foaming extents thereof is 28.73-fold, and the foam board 2 of polypropylene resin having an interconnected cell ratio of 50% or higher and a high foaming extent can be manufactured by the manufacturing method for the vehicle interior finishing laminate sheet 1 in accordance with the present invention.

As explained in the first embodiment, the foam board 2 can be used as it is as the core member of the vehicle interior finishing laminate sheet 1. However, the size of the foam board 2 is small as the core member for a large-size vehicle interior trim material such as a roof lining. Therefore, to obtain the vehicle interior finishing laminate sheet 1 having a size such that it can also be used for a roof lining, a plurality of form boards 2 must be joined to make a large-size core member. Second and third embodiments shown below relate to a method for joining the plurality of form boards 2 or a core member manufactured by joining the form boards 2.

Second Embodiment

Figure 6:
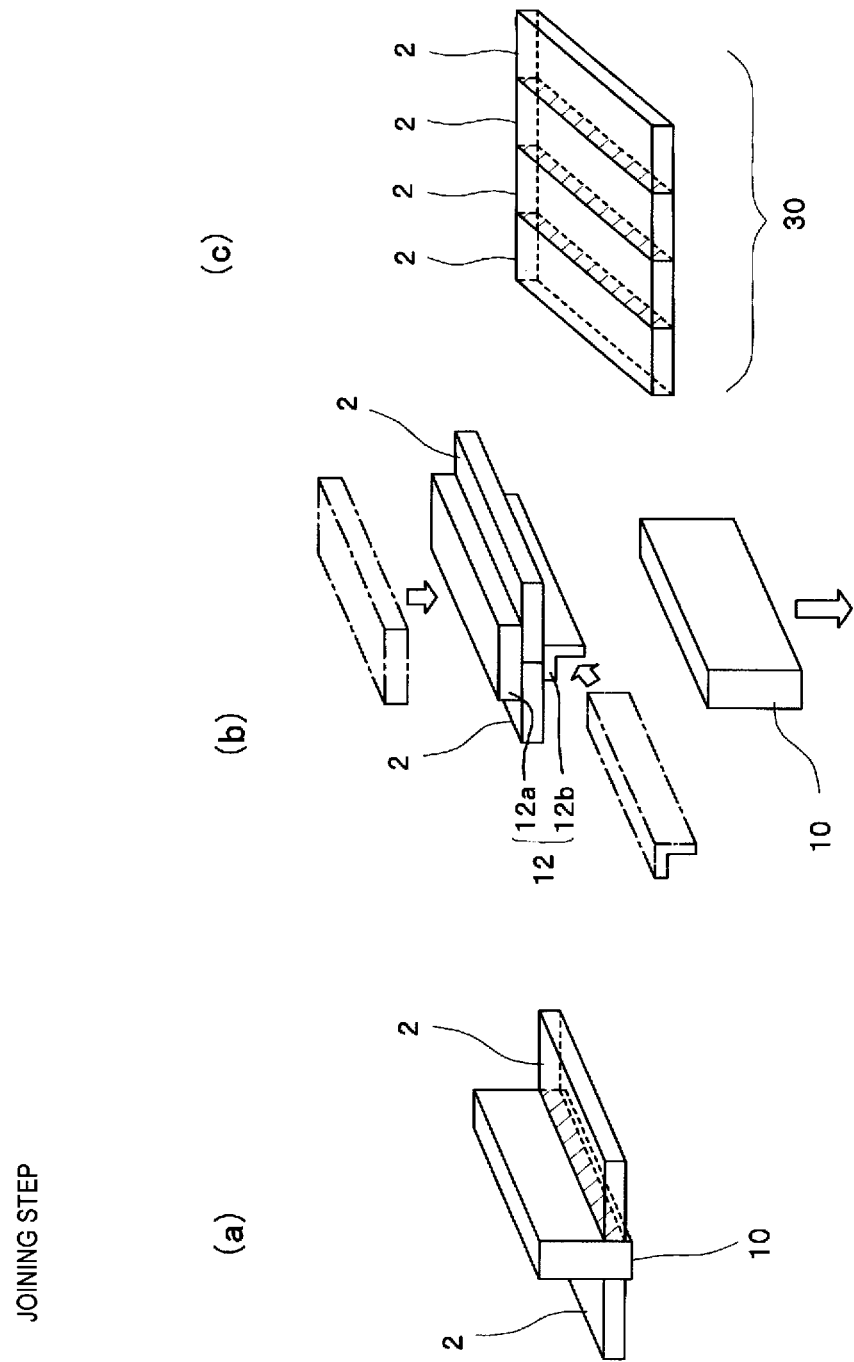
FIG. 6 is explanatory views showing a flow of a joining step of a manufacturing process for a vehicle interior finishing laminate sheet in accordance with a second embodiment.
Figure 7:
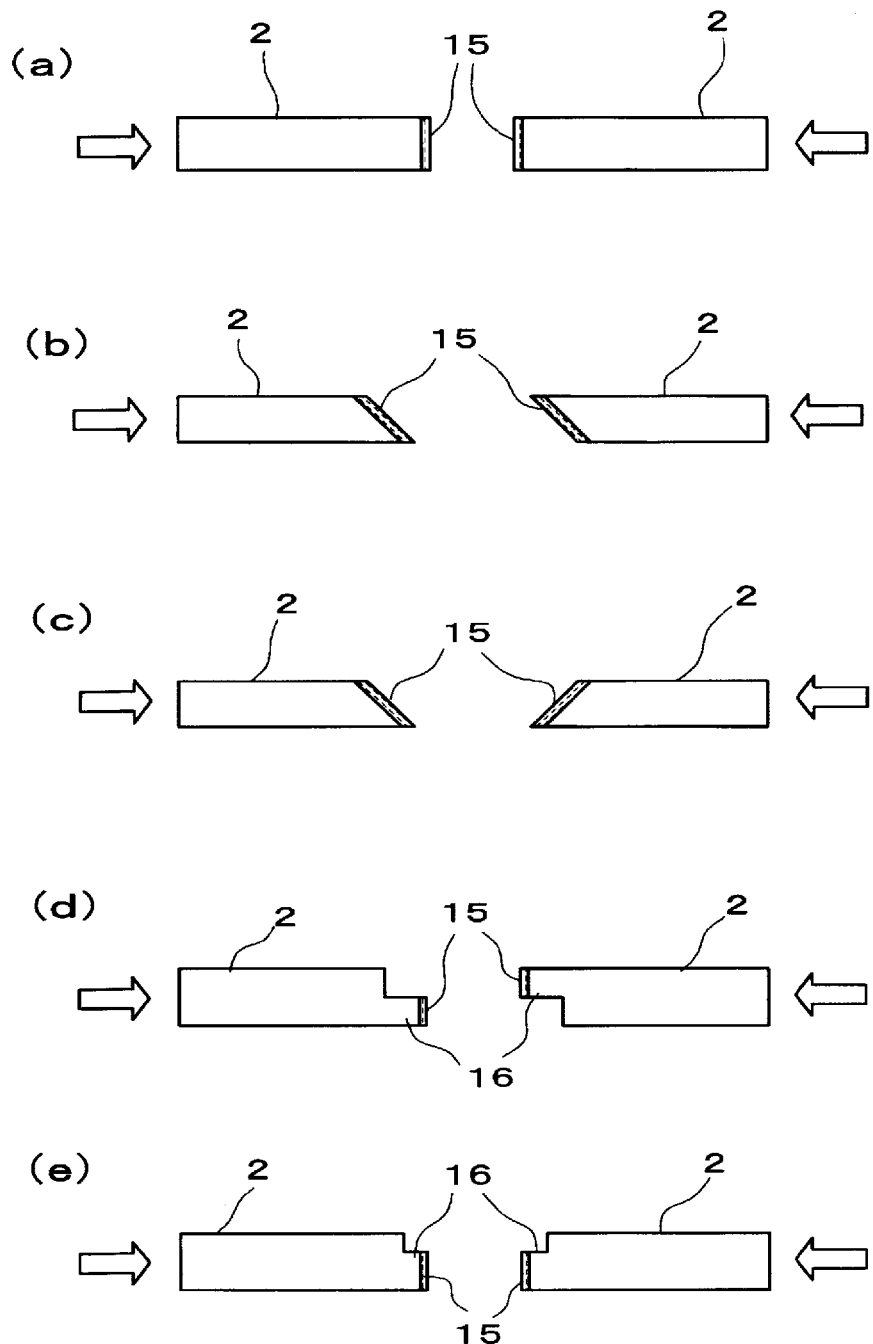
FIG. 7 is explanatory views of the shape of a joint face in a joining step in accordance with a second embodiment.
Figure 8:
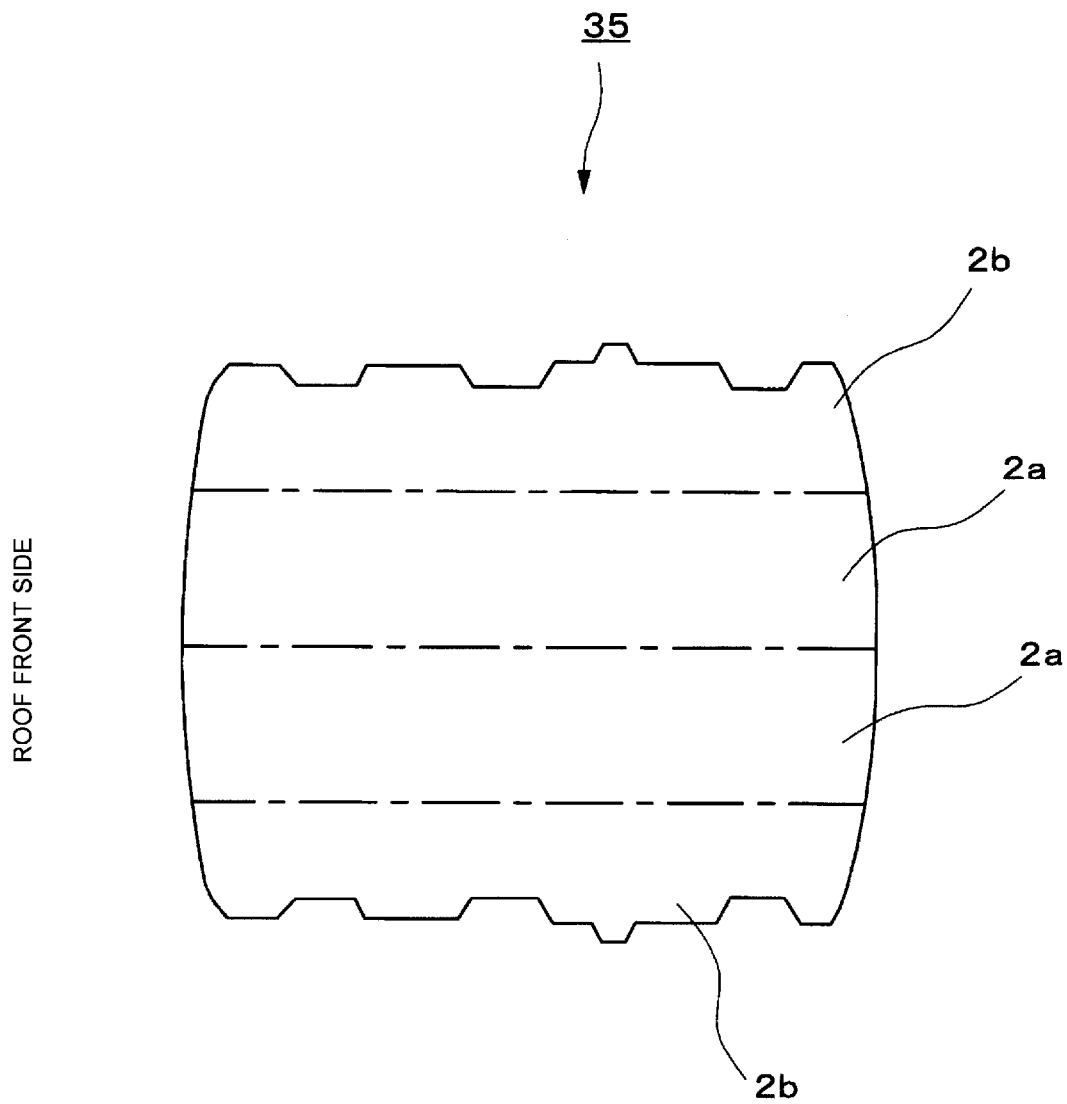
FIG. 8 is an explanatory view of the joint arrangement of foam boards forming a roof lining core member in accordance with example 1 of a second embodiment.
Figure 9:
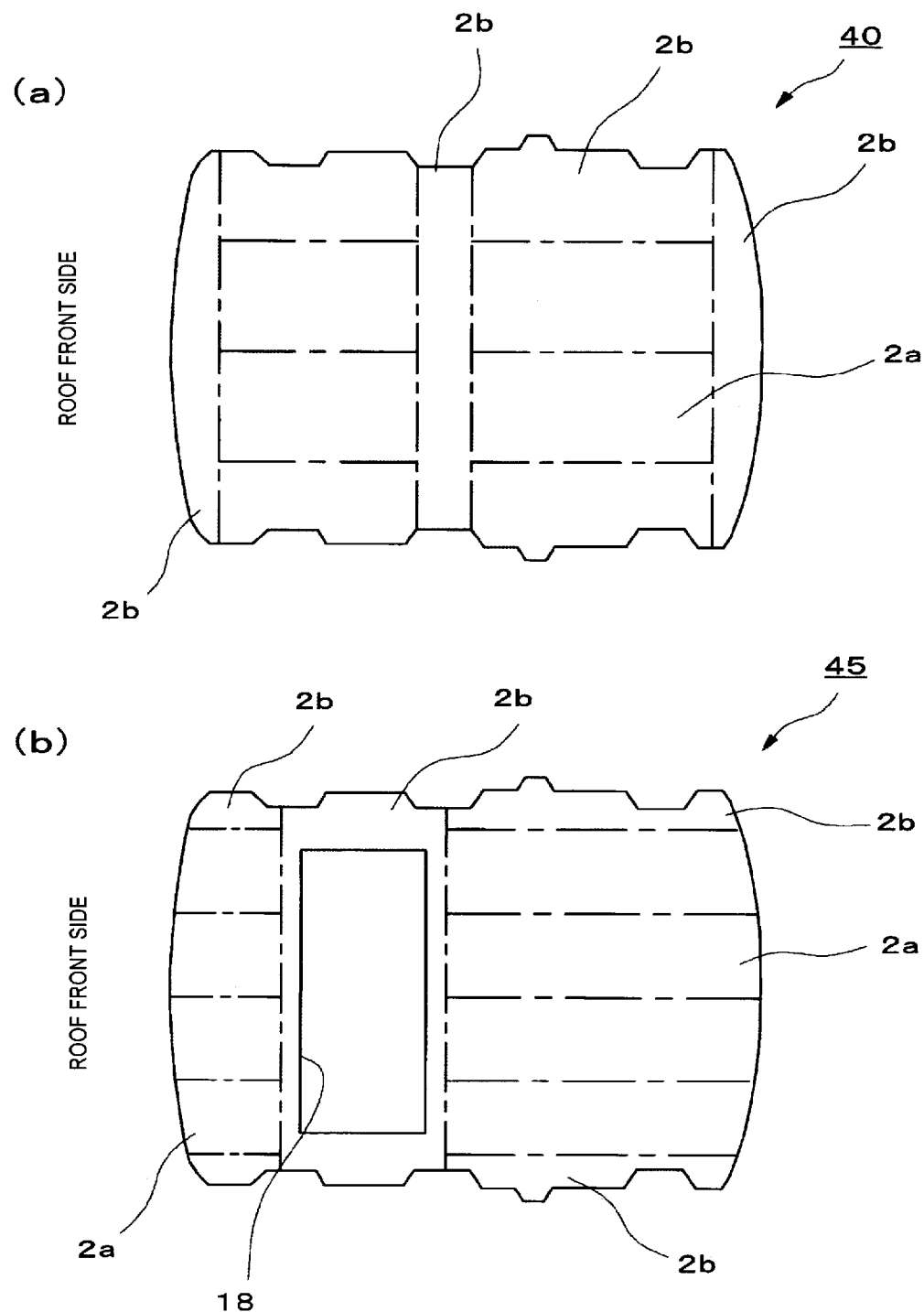
FIG. 9 is explanatory views of the joint arrangement of foam boards forming a roof lining core member in accordance with examples 2 and 3 of a second embodiment.

FIGS. 6 to 9 relate to a second embodiment. FIG. 6 is explanatory views showing a flow of a joining step of the manufacturing process for the vehicle interior finishing laminate sheet, FIG. 7 is explanatory views of the shape of a joint face in the joining step, FIG. 8 is an explanatory view of the joint arrangement of the foam board forming the roof lining core member in accordance with example 1, and FIG. 9 is explanatory views of the joint arrangement of the foam board forming the roof lining core member in accordance with examples 2 and 3.

The second embodiment relates to a method for manufacturing the core member of the vehicle interior finishing laminate sheet 1 manufactured by joining the foam boards 2 described in the first embodiment. In this embodiment, explanation is given of roof lining core members 30, 35, 40 and 45 used as a roof material disposed on the indoor-side surface of a vehicle roof panel as a vehicle interior trim material. However, the second embodiment can be not only applied to the roof lining core member but also applied similarly to a sound absorbing material in a trunk room, an engine room, etc., a sound absorbing material of a door member, and the like.

The roof lining core member 30 of this embodiment is manufactured by performing a joining step shown in FIG. 6 between Step S2 and Step S3 explained in the first embodiment. In the joining step, the foam boards 2 are joined to each other by the hot plate welding method in which the foam boards 2 melted by being brought into contact with a heated metal plate are butted against each other. When a core member larger than the foam board 2 manufactured by the extrusion foam molding of Step S1 is necessary, the large-size foam board 2 can be obtained by joining the plurality of foam boards 2.

The joining step using the hot plate welding method is explained in detail with reference to FIGS. 6(a) to 6(c). The hot plate welding method is a method for joining two foam boards 2, 2 by using a heating plate 10 and a set of two pressing plates 12. This joining method is suitable for joining polypropylene-made materials having thermoplasticity. The heating plate 10 is a substantially plate-shaped metallic member for welding the foam boards 2 to each other by being brought into contact with the joint faces. The pressing plate 12 is a member for pressing the joint parts of the foam boards 2 by holding them from the upside and the downside when the foam boards 2 are joined to each other. An upper pressing plate 12a is formed into a plate shape, and a lower pressing plate 12b is formed substantially into an L shape in cross section.

First, the heating plate 10 is brought into contact with the joint faces of two foam boards 2 to be jointed (refer to FIG. 6(a)). At this time, the heating plate 10 is brought into contact with the joint faces after the joint faces to be brought into contact with the heating plate 10 is adjusted so as to be vertical. This is because a uniform welding layer is obtained. Next, the heating plate 10 is removed by being moved to below the foam boards 2, 2, and the joint faces in a molten state of the foam boards 2, 2 are butted against each other under pressure, by which the two foam boards 2, 2 are joined (refer to FIG. 6(b)). At this time, the joint parts are held from the upside and the downside by the pressing plate 12. By holding the joint parts by using the pressing plate 12, a shift of the joint position can be eliminated. Since the joining is performed by utilizing thermal welding, unlike the case where an adhesive is used, there is no fear of producing a volatile organic compound (VOC), and the foam boards 2, 2 can be joined firmly to each other.

By joining the foam boards 2, 2 to each other by the above-described hot plate welding method, a core member having a wider width and a longer length than the molded foam board 2 can be formed freely (refer to FIG. 6(c)). In particular, since the core member used for a roof lining requires a width of 1500 mm or wider, the plurality of foam boards 2 molded by extrusion molding must be joined by being arranged in the width direction. In this embodiment, four foam boards 2 formed so as to have a width of 400 mm are joined in the width direction to obtain the roof lining core member 30.

In the above-described hot plate welding method, the foam boards having a different foaming extent or mechanical strength can be joined to each other. For example, the foam board 2 having a decreased foaming extent and increased mechanical strength and the foam board 2 having an increased foaming extent and increased sound absorption ratio while having a light weight are joined alternately in large numbers in the width direction, by which a core member having a light weight, a high mechanical strength, and a high sound absorption ratio can be manufactured. The foam boards 2 having a varied foaming extent are manufactured in advance, and these foam boards 2 are combined appropriately and joined to each other, by which the sound absorption ratio and mechanical strength can be adjusted. The foam boards 2 can be joined not only in the transverse width direction but also in the lengthwise direction. For example, in the case of the roof lining core member 30, four foam boards 2 having the same foaming extent are joined in the width direction. However, the core member is manufactured by joining the foam boards 2, having a low foaming extent crossing in the width direction, every 450 mm in the lengthwise direction, by which the rigidity of roof lining can be increased without impairing the sound absorption properties. In particular, this core member is suitable as a core member of a large-size roof lining used for a minivan of a one box type, a wagon type, or the like type.

FIGS. 7(a) to 7(e) show examples of shapes of joint faces. The upper side in the figures is a design surface (indoor side) and a surface disposed in the vehicle inside direction when the roof lining is installed. In the figures, a region melted by the hot plate is shown as a fused layer 15. First, if the fused face is formed into an inclined face as shown in FIG. 7(b), the foam boards 2, 2 can be joined firmly to each other because the joint area increases as compared with the fused face cut vertically (refer to FIG. 7(a)). In this case, the heating plate 10 formed with an inclined surface must be used, or the heating plate 10 must be used in an inclined posture. The inclination angle formed on the joint face is 30 to 90 degrees (90 degrees means a face cut vertically).

In the case where two opposed fused faces are formed into inclined faces having an inverse angle as shown in FIG. 7(c), the foam boards 2 can be joined in a pointed portion butted at the time of joining. By joining the foam boards 2 in this manner, undulation can be prevented from appearing on the design surface in the laminating step due to a difference in rigidity of the joint face. That is to say, since cells are collapsed by melting, and thereby the rigidity of fused face is increased, after the compressing operation using a press, a defective shape, for example, a projection of the welded portion appears on the design surface. In the case shown in FIG. 7(c), such a defective shape can be prevented. If the joint face is formed into a crank shape as shown in FIG. 7(d), since only a tip end portion of an extending part 16 melts, the fusion area is halved as compared with the case where the foam board is cut longitudinally. Therefore, the case shown in FIG. 7(d) has an advantage of shortening the heating time using the heating plate 10. Also, since the joint face is steric, the joint strength is also secured. The length of the extending part is preferably in the range of 1 to 15 mm. By forming a notch part in the joint face on the design surface side of the foam board as shown in FIG. 7(e), as in the case shown in FIG. 7(c), undulation can be prevented from appearing on the design surface in the laminating step.

Next, examples other than the roof lining core member 30 in this embodiment are explained with reference to examples 1 to 4.

Example 1

The roof lining core member 35, which is the core member of a roof lining laminate sheet, is explained. Four foam boards 2 each having a width of 400 mm were joined in the width direction, by which a core member having a width such that the core member can be used as a roof lining (1500 mm or wider) was manufactured by the joining step. The joining was performed by hot plate welding (refer to FIG. 6). FIG. 8 is an explanatory view of the joint arrangement of the foam boards 2 forming the roof lining core member 35 having been manufactured. A total of four foam boards, two foam boards 2b of low foaming extent and two foam boards 2a of high foaming extent, were joined to form the roof lining core member 35. To both edge parts of the roof lining core member 35, the foam boards 2b of low foaming extent having a high mechanical strength were joined, and in the central part, the two foam boards 2a of high foaming extent having a high sound absorption ratio were used.

By this configuration, the roof lining core member 35 having both of high strength of attachment part to the vehicle and high sound absorption properties can be formed. As the foam board 2b of low foaming extent having a high strength arranged in both edge parts, a foam board having a foaming extent of 10- to 25-fold, preferably 25-fold, is used, and as the foam board 2a of high foaming extent having a high sound absorption ratio arranged in the central part, a foam board having a foaming extent of 35-fold is used. For the roof lining configured by laminating the cover material, the reinforcing material, and the like on the roof lining core member 35 manufactured as described above, the rigidity can be improved without degradation of light weight, sound absorption properties, and production efficiency.

Example 2

FIG. 9(a) shows another example in which the roof lining core member 40 is formed by combining the foam boards 2a of high foaming extent and the foam boards 2b of low foaming extent with each other by the joining step. Four foam boards of two kinds (2a, 2b) having a width of 400 mm are joined in the width direction, and also the foam boards 2 of two kinds are joined in the lengthwise direction. The joining method in the width direction is the same as the joining method for the above-described roof lining core member 35 shown in example 1. However, in the lengthwise direction as well, the foam boards 2b of low foaming extent crossing the roof lining core member 40 are joined at three places: the portions in which the foam boards 2b of low foaming extent are attached to the roof front end part and the roof rear end part and the central portion of the roof lining core member 40. By this configuration, the rigidity of the attachment portions can be enhanced, and the rigidity and durability of the roof lining core member 40 itself can be improved. As the foam board 2b of low foaming extent, a foam board having a foaming extent of 10- to 25-fold, preferably 25-fold, is used, and as the foam board 2a of high foaming extent, a foam board having a foaming extent of 35-fold is used.

For the roof lining core member 40 of this example, the joint position of the foam board 2b of low foaming extent must be caused to coincide with the attachment positions in the roof front end part and the roof rear end part. Therefore, in a mold drawing step performed when the manufactured vehicle interior finishing laminate sheet 1 is thermoformed, the mold drawing position is controlled. In this example, in the joining step, a positioning hole part is formed at a defined position of the foam board 2 on the outside along with the joining. This positioning hole part is configured so as not to be closed even in the laminating step. By detecting infrared light passing the positioning hole part by using an optical sensor, the position is identified, and the positioning and the position correction for mold drawing are accomplished. This positioning hole part is formed in the outside portion that is disposed of by mold drawing. Also, as the positioning method for mold drawing, any other publicly known method can be used optionally. For example, a method may be used in which a convex part is formed at a specific position in the joining step or the laminating step, and this convex part is detected by using a distance sensor to detect the position.

Example 3

FIG. 9(b) shows an example of a core member formed with an opening part 18, the core member being configured by combining the foam boards 2a of high foaming extent and the foam boards 2b of low foaming extent with each other by the joining step. In this example, the foam board 2 to be joined has a width of 300 mm. By joining six foam boards 2 in the width direction, the roof lining core member 45 is obtained. The foam boards 2 on both sides attached to a vehicle roof are the foam boards 2b, 2b of low foaming extent. Also, the roof lining core member 45 is formed with the sun roof opening part 18, and the surroundings of this sun roof opening part 18 are also configured by the foam board 2b of low foaming extent. By this configuration, the rigidity of the attachment parts on both sides and the attachment part attached to a sun roof part can be enhanced, so that the rigidity and durability of the roof lining itself can be improved. In this example, as the foam board 2b of low foaming extent, a foam board having a foaming extent of 10- to 25-fold, preferably 15-fold, is used, and as the foam board 2a of high foaming extent, a foam board having a foaming extent of 35-fold is used. The sun roof opening part 18 is formed simultaneously at the time of mold drawing. The explanation of other manufacturing methods is omitted because they are the same as those for the roof lining core member 35 of example 2.

Example 4

In example 3, the surroundings of the sun roof opening part 18 are formed by the foam board 2b of low foaming extent. The surroundings of the opening part 18 to which a panel mounted with an indoor illuminating lamp, a switch, a liquid crystal monitor, and the like is attached can also be configured by the foam board 2b of low foaming extent as in example 3. In this case, the panel is fitted in the opening part 18 after mold drawing, and is directly fixed to the vehicle interior finishing laminate sheet 1 of this example, by which a more self-contained module can be formed. Also, an interior trim material having improved integration feeling and appearance can be configured, and the manpower in a step in which the interior trim material is installed on a vehicle can be reduced. As the foam board 2b of low foaming extent, a foam board having a foaming extent of 10- to 25-fold, preferably 15-fold, is used, and as the foam board 2a of high foaming extent, a foam board having a foaming extent of 35-fold is used.

Third Embodiment

Figure 10:
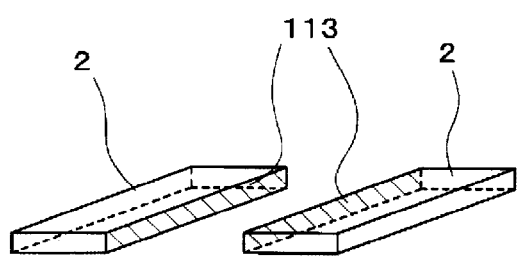
FIG. 10 is explanatory views showing a flow of a joining step of a manufacturing process for a vehicle interior finishing laminate sheet in accordance with a third embodiment.
Figure 10:
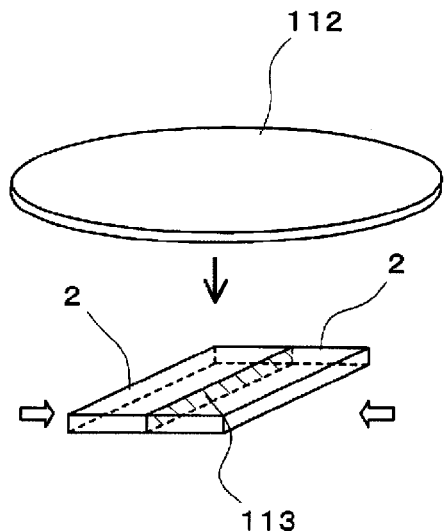
Figure 10:
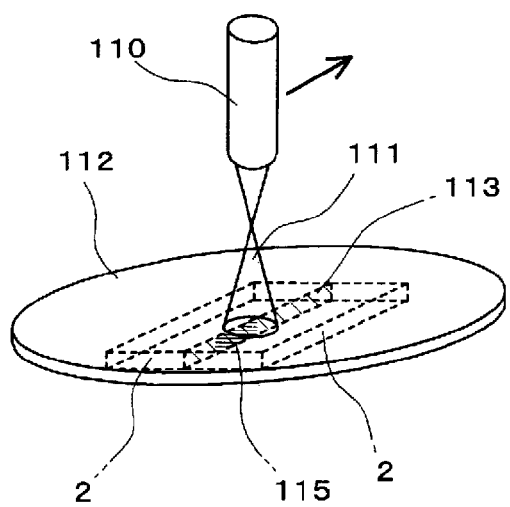
Figure 10:
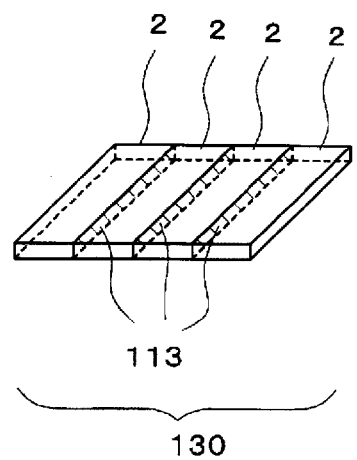
Figure 11:
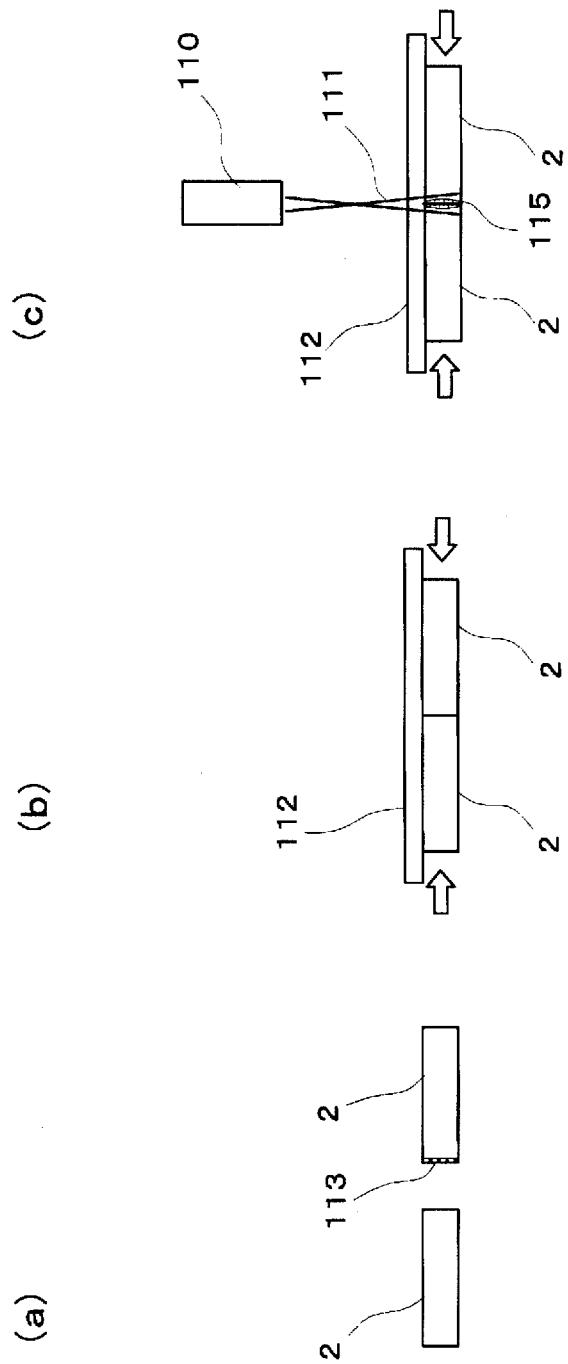
FIG. 11 is sectional explanatory views in a joining step in accordance with a third embodiment.
Figure 12:
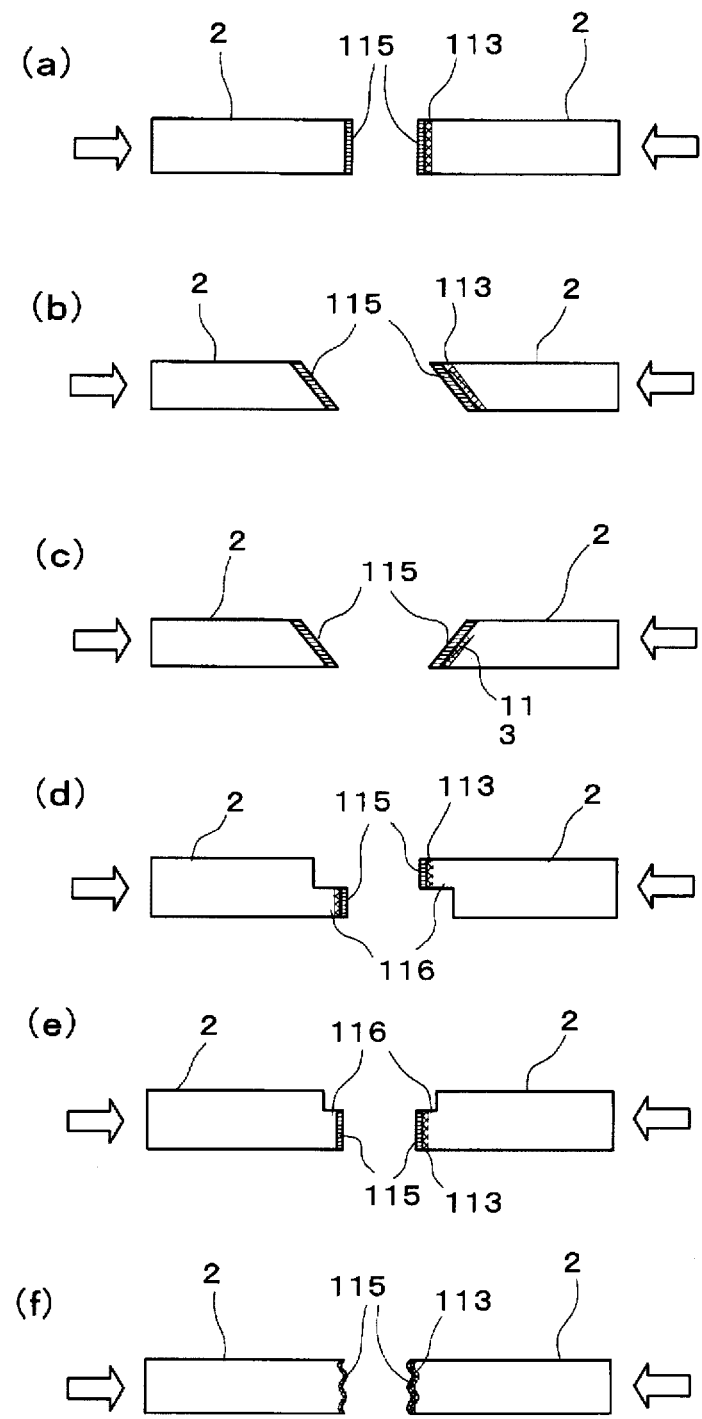
FIG. 12 is explanatory views of the shape of a joint face in a joining step in accordance with a third embodiment.
Figure 13:
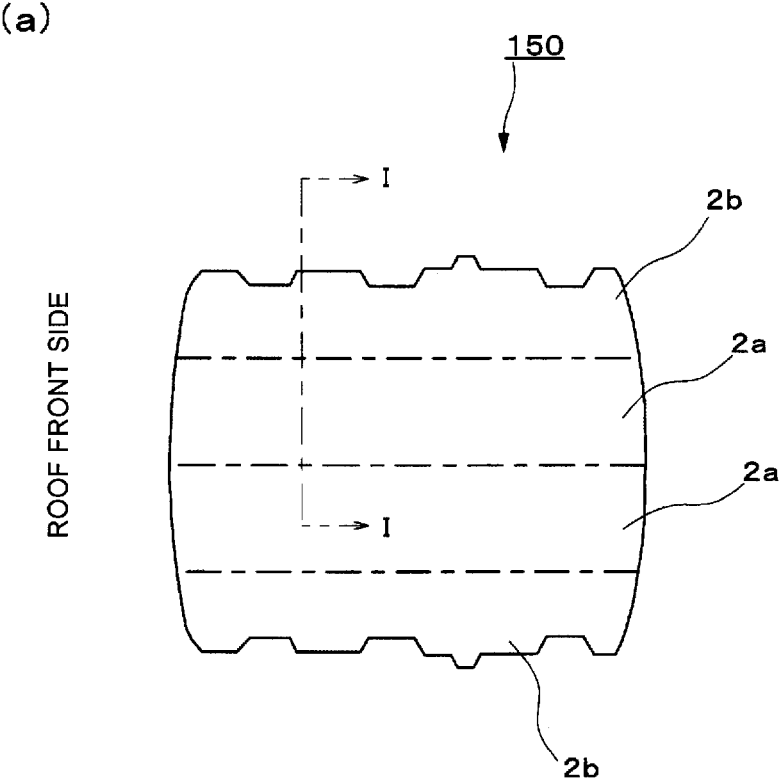
FIG. 13 is explanatory views of the joint arrangement of foam boards forming a roof lining core member in accordance with example 2 of a third embodiment.
Figure 13:
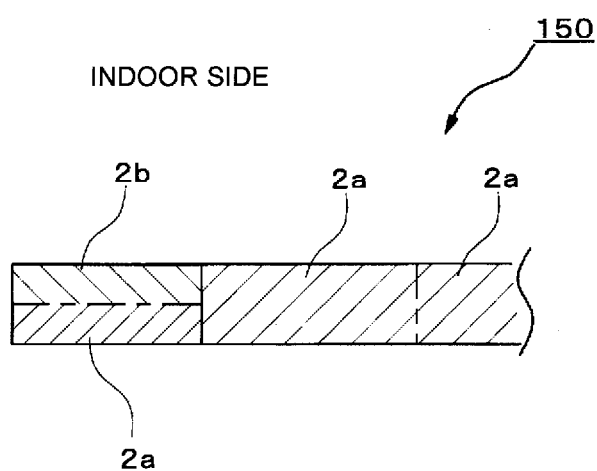
Figure 14:
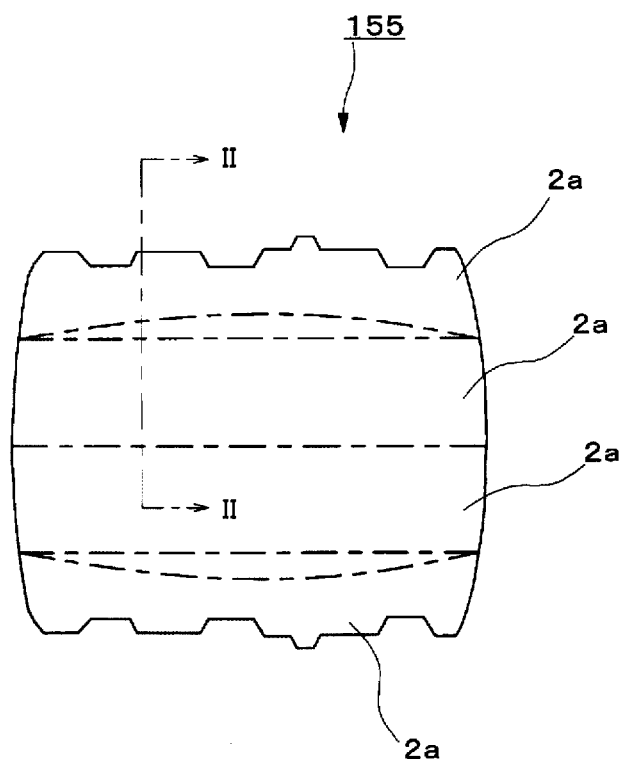
FIG. 14 is explanatory views of the joint arrangement of foam boards forming a roof lining core member in accordance with example 3 of a third embodiment.
Figure 14:
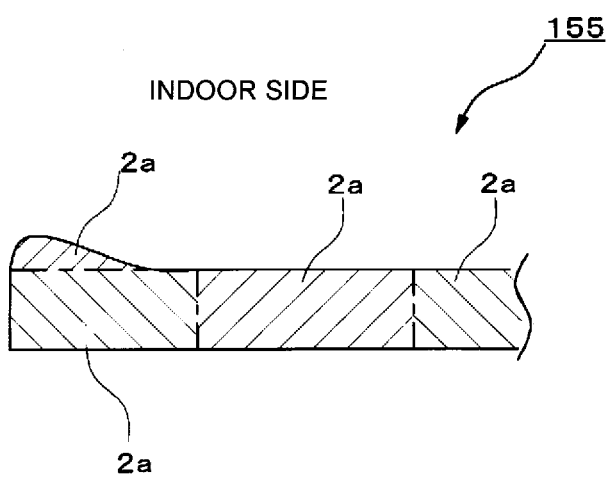

FIGS. 10 to 14 relate to a third embodiment. FIG. 10 is explanatory views showing a flow of a joining step of the manufacturing process for the vehicle interior finishing laminate sheet, FIG. 11 is sectional explanatory views in the joining step, FIG. 12 is explanatory views of the shape of a joint face in the joining step, FIG. 13 is explanatory views of the joint arrangement of foam boards forming a roof lining core member in accordance with example 2, and FIG. 14 is explanatory views of the joint arrangement of foam boards forming a roof lining core member in accordance with example 3.

This embodiment relates to a method for manufacturing the core member of the vehicle interior finishing laminate sheet 1 manufactured by joining the foam boards 2 described in the first embodiment as in the second embodiment. In this embodiment, explanation is given of roof lining core members 130, 150, and 155 used as a roof material disposed on the indoor-side surface of a vehicle roof panel as a vehicle interior trim material. However, this embodiment can be not only applied to the roof lining core member but also applied similarly to a sound absorbing material in a trunk room, an engine room, etc., a sound absorbing material of a door member, and the like.

The roof lining core member 130 is manufactured by performing a joining step as shown in FIG. 10 between Step S2 and Step S3. In this embodiment, a laser transmission welding method is used as the joining method. A colored agent 113, serving as a heat generating agent, applied to the joint face of the foam board 2 is heated by a laser beam 111 (semiconductor laser) penetrating the foam board 2, by which the foam boards 2, 2 are joined by melting the faces thereof to be joined. The colored agent 113 is stained to a color liable to absorb the laser beam 111.

The joining step using the laser transmission welding method shown in FIGS. 10(*a*) to 10(*d*) and FIGS. 11(*a*) to 11(*c*) is explained. The laser transmission welding method is a method for joining two foam boards 2, 2 by using a laser light source 110 and a pressing plate 112, serving as a regulating member, consisting of a transparent acrylic plate, and a joining method suitable for the joining of polypropylene materials having thermoplasticity. As the laser light source 110, a semiconductor laser (LD: laser diode) is used. However, a YAG laser may also be used.

First, the two joint faces to be joined are worked into a vertical plane so as to be brought into close contact with each other to obtain a uniform welding layer (refer to FIG. 10(*a*)). Next, the colored agent 113 that generates heat due to irradiation of the laser beam 111 is applied to the joint faces of the foam boards 2, 2 (refer to FIGS. 10(*a*) and 11(*a*)). As shown in FIGS. 10(*b*) and 11(*b*), a state in which a pressure is applied so that the joint faces of the foam boards 2, 2 come surely into contact with each other is maintained. The joint faces held in close contact to one another by the pressure are irradiated with the laser beam 111. The laser beam 111 is emitted while the distance between the laser light source 110 and the foam boards 2, 2 is kept constant so that the joint faces are scanned from above the foam boards 2, 2 (refer to FIGS. 10(*c*) and 11(*c*)). Since the laser beam 111 has a property of penetrating a resin, the polypropylene-made foam board 2, 2 parts do not generate heat. However, the colored agents 113 applied to the joint faces generate heat due to the absorption of the laser beam 111. The foam boards 2, 2 of the joint face parts are melted by the heat generation of the colored agents 113, so that the joint faces that make close contact with each other oppositely due to the pressure are welded. At this time, since the joint part is held between the pressing plate 112 on the upside and the base material on the downside, the joint position is prevented from shifting. Since the pressing plate 112 on the upside is formed by a transparent acrylic plate capable of transmitting the laser beam 111, the laser beam 111 can be emitted while the foam boards 2, 2 are fixed in a state of being to be joined. Since the joining is performed by utilizing thermal welding, unlike the case where an adhesive is used, there is no fear of producing a volatile organic compound (VOC), and the foam boards 2, 2 can be joined firmly to each other.

In this embodiment, since the foam boards 2, 2 are joined to each other by the above-described laser transmission welding method, a core member having a width and a length greater than the molded foam board 2 can be formed freely (refer to FIG. 10(*d*)). In particular, since the core member used for a roof lining must have a width of 1500 mm or wider, a plurality of foam boards formed by extrusion molding must be joined to each other so as to be arranged in the width direction. In this embodiment, as in the second embodiment, the roof lining core member 130 is obtained by joining four foam boards 2, which are formed so as to have a width of 400 mm, in the width direction.

In the above-described laser transmission welding method, the foam boards 2 having a different foaming extent or mechanical strength can be joined to each other. For example, the foam board 2 having a decreased foaming extent and increased mechanical strength and the foam board 2 having an increased foaming extent and increased sound absorption ratio while having a light weight are joined alternately in large numbers in the width direction, by which a foam board 2 having a light weight, a high mechanical strength, and a high sound absorption ratio can be manufactured. The foam boards 2 having a varied foaming extent are manufactured in advance, and these foam boards 2 are combined appropriately and joined to each other, by which the sound absorption ratio and mechanical strength can be adjusted. The foam boards 2 can be joined not only in the transverse width direction but also in the lengthwise direction.

For example, in the case of the roof lining core member 130, four foam boards 2 having the same foaming extent are joined in the width direction. However, the core member is manufactured by joining the foam boards 2, having a low foaming extent crossing in the width direction, every 450 mm in the lengthwise direction, by which the rigidity of roof lining can be increased without impairing the sound absorption properties. In particular, this core member is suitable as a core member of a large-size roof lining used for a minivan of a one box type, a wagon type, or the like type. Also, since the laser beam 111 penetrates the foam board 2, the foam boards 2 having a different foaming extent can be joined to each other in the thickness direction as well. For example, the roof lining core member 130 is made such as to have a double structure in which the foam board 2a of high foaming extent having high sound absorption properties is disposed on the outdoor side, and the foam board 2b of low foaming extent having a high strength is disposed on the indoor side, by which the roof lining core member 130 having both of high sound absorption properties and high strength (rigidity) can be formed.

FIGS. 12(a) to 12(f) show examples of shapes of joint face. The upper side in the figures is a design surface (indoor side) and a surface disposed in the vehicle inside direction when the roof lining is installed. In the figures, a region melted by the colored agent 113 is shown as a fused layer 115. First, if the fused face is formed into an inclined face as shown in FIG. 12(b), the foam boards 2, 2 can be joined firmly to each other because the joint area increases as compared with the fused face cut vertically (refer to FIG. 12(a)). The inclination angle formed on the joint face is 30 to 90 degrees (90 degrees means a face cut vertically).

In the case where two opposed joint faces are formed into inclined faces having an inverse angle as shown in FIG. 12(c), the foam boards 2 can be joined in a pointed portion butted at the time of joining. By joining the foam boards 2 in this manner, undulation can be prevented from appearing on the design surface in the laminating step due to a difference in rigidity of the joint face. That is to say, since cells are collapsed by melting, and thereby the rigidity of fused face is increased, after the compressing operation using a press, a defective shape, for example, a projection of the welded portion appears on the design surface. In the case shown in FIG. 12(c), such a defective shape can be prevented. If the joint face is formed into a crank shape as shown in FIG. 12(d), since only a tip end portion of an extending part 116 melts, the fusion area is halved as compared with the case where the foam board 2 is cut longitudinally. Therefore, the case shown in FIG. 12(d) has an advantage of shortening the heating time using the laser light source 110. Also, since the joint face is steric, the joint strength is also secured. The length of the extending part 116 is preferably in the range of 1 to 15 mm. By forming a notch part in the joint face on the design surface side of the foam board 2 as shown in FIG. 12(e), as in the case shown in FIG. 12(c), undulation can be prevented from appearing on the design surface in the laminating step. If wave-shaped undulation is formed on the joint face as shown in FIG. 12(f), the foam boards 2 can be joined more firmly to each other because the joint area increases. An effect that is the same as that in FIG. 12(b) can be anticipated. Since the laser beam 111 can penetrate the foam board 2, the shape of the joint face can be set relatively freely.

Next, examples other than the roof lining core member 130 in this embodiment are explained with reference to examples 1 to 3.

Example 1

A roof lining core member 135, which is the core member of a roof lining laminate sheet, is explained. Four foam boards 2 each having a width of 400 mm were joined in the width direction, by which a core member having a width such that the core member can be used as a roof lining (1500 mm or wider) was manufactured. The joining was performed by laser transmission welding (refer to FIGS. 10 and 11). A total of four foam boards, two foam boards 2b of low foaming extent and two foam boards 2a of high foaming extent, were joined to form the roof lining core member 135. To both edge parts of the roof lining core member 135, the foam boards 2b of low foaming extent having a high mechanical strength were joined, and in the central part, the two foam boards 2a of high foaming extent having a high sound absorption ratio were used.

By this configuration, the roof lining core member 135 having both of high strength of attachment part to the vehicle and high sound absorption properties can be formed. As the foam board 2b of low foaming extent having a high strength arranged in both edge parts, a foam board having a foaming extent of 25-fold is used, and as the foam board 2a of high foaming extent having a high sound absorption ratio arranged in the central part, a foam board having a foaming extent of 35-fold is used. For the roof lining configured by laminating the cover material, the reinforcing material, and the like on the roof lining core member 135 manufactured as described above, the rigidity can be improved without degradation of light weight, sound absorption properties, and production efficiency. The roof lining core member 135 is almost the same as the roof lining 35 explained in the second embodiment although the joining method is different. Besides, a core member that is the same as the roof lining core members 40 and 45 explained in the second embodiment can be manufactured by the laser transmission welding method of this embodiment.

Example 2

Since the laser beam 111 has a property of penetrating the foam board 2, the foam boards 2 having a different foaming extent can be joined to each other by being lapped in the thickness direction as well. FIG. 13(a) is an explanatory view of the roof lining core member 150 in which the foam boards 2 are joined partially in the thickness direction. On the indoor side of the edge part of the roof lining core member 150 shown in FIG. 13(a), the foam board 2b of low foaming extent is affixed. Also, FIG. 13(b) is a sectional explanatory view taken along the line I-I of FIG. 13(a). The edge part of the roof lining must have a higher strength than other parts because the edge part is a part attached to the vehicle roof. By configuring the roof lining core member 150 by lappingly affixing the foam board 2b of low foaming extent having a high strength to this attachment part, the roof lining core member 150 having both of high strength of attachment part to the vehicle and high sound absorption properties can be formed.

Specifically, the core member of two-layer structure manufactured by lapping the foam boards in the thickness direction is joined in a portion requiring strength, such as the attachment part. The foam board 2a of high foaming extent having high sound absorption properties is disposed on the outdoor side, and the foam board 2b of low foaming extent having a high strength is disposed on the indoor side. This core member of two-layer structure is joined by emitting the laser beam 111 toward the joint faces of the foam board 2a of high foaming extent and the foam board 2b of low foaming extent that are brought into close contact with each other by applying the colored agent 113. At this time, the laser beam 111 is emitted while the laser light source 110 is moved over the whole of the joint faces. By emitting the laser beam 111 evenly to the joint faces to which the colored agent 113 is applied, the foam boards 2 can be joined firmly to each other. The core member of two-layer structure manufactured as described above is welded to the edge part of another core member by the laser transmission welding method, by which the roof lining core member 150 is formed. As the foam board 2b of low foaming extent having a high strength arranged in both edge parts, a foam board having a foaming extent of 10- to 25-fold, preferably 25-fold, is used, and as the foam board 2a of high foaming extent having a high sound absorption ratio arranged in the central part, a foam board having a foaming extent of 35-fold is used. By using the laser transmission welding method, joining between members having a broad joint face, which is difficult to perform by using other thermal welding methods, can be performed.

Example 3

FIG. 14(*a*) is an explanatory view of the roof lining core member 155 in accordance with example 3, and FIG. 14(*b*) is a sectional explanatory view of the roof lining core member 155 taken along the line II-II of FIG. 14(*a*). The roof lining 155 of this example is formed with undulation by partially changing the thickness of the foam board 2 to be joined, and is configured by the foam boards 2a of high foaming extent having high sound absorption properties only. In the attachment part requiring strength, the rigidity of core member can be improved by joining the foam board 2a of high foaming extent and increasing the thickness of a part requiring strength (rigidity). According to this method, the roof lining core member 155 can be configured by the foam boards 2a of high foaming extent only, so that high sound absorption properties can be secured.

In the above-described examples, the joint face is a flat plane. However, the joint face may be a curved line or a curved plane. By making the joint face a curved plane, the joint area can be increased, so that the foam boards can be joined more firmly to each other. Also, only a part requiring strength, such as a claw part for attachment, is formed by the foam board 2b of low foaming extent, by which the ratio of the foam board 2a of high foaming extent having high sound absorption properties is increased. Thereby, the sound absorption properties can be improved while a necessary strength (rigidity) is secured.

The present invention is not limited to the above-described examples. The vehicle interior finishing laminate sheet 1 can be configured by combining the foam board 2b of low foaming extent with the foam board 2a of high foaming extent in any region of the vehicle interior finishing laminate sheet 1. For example, in the case where a lighting fixture or the like is attached to the roof lining, a part to which a connector for supplying power to the lighting fixture is attached is formed by the foam board 2b of low foaming extent. Thereby, a partially high rigidity can be secured without sacrifice of sound absorption properties as the whole of roof lining.

The invention claimed is:

1. A vehicle interior finishing laminate sheet provided with a core member consisting of a polypropylene resin foam board, wherein the polypropylene resin foam board is formed from a non-crosslinked polypropylene resin exhibiting a strain hardening phenomenon in which the non-crosslinked polypropylene resin is elongated in a molten state and a viscosity of the non-crosslinked polypropylene resin rises suddenly before cutting, the non-crosslinked polypropylene resin having a semi-crystallization time such that crystallization begins before a highest viscosity of foamed resin is reached, wherein the polypropylene resin foam board is extrusion molded into a plate shape, and wherein the polypropylene resin foam board has an interconnected cell ratio of 50% or higher and a foaming extent of 10- to 50-fold.

2. The vehicle interior finishing laminate sheet according to claim 1, wherein a foaming extent is 30- to 35-fold.

3. The vehicle interior finishing laminate sheet according to claim 1, wherein the polypropylene resin foam board is formed with a skin layer on both surfaces thereof.

4. The vehicle interior finishing laminate sheet according to claim 1, wherein a sheet-shaped reinforcing material is provided on both surfaces of the polypropylene resin foam board.

5. The vehicle interior finishing laminate sheet according to claim 1, wherein
   a core member is formed by welding ends of a thickness side of a plurality of polypropylene resin foam boards each consisting of a plate body having a predetermined thickness;
   the welding is performed by buttedly joining the polypropylene resin foam boards to form joints; and,
   the joints are melted together by being brought into contact with a heated metal plate.

6. The vehicle interior finishing laminate sheet according to claim 5, wherein the vehicle interior finishing laminate sheet consists of the core member formed by joining the polypropylene resin foam boards formed with a concave part in a corner part of a joint surface disposed on an indoor side on opposed joint surfaces of the polypropylene resin foam boards.

7. The vehicle interior finishing laminate sheet according to claim 1, wherein the core member consists of a plate body having a predetermined thickness, and wherein the core member is formed by joining ends on the thickness side or the surfaces in a thickness direction of the plurality of polypropylene resin foam boards having a predetermined thickness by using a joint, and wherein the joint of the core member has a plane-shaped hardened layer which is heated by absorption of a laser beam.

8. The vehicle interior finishing laminate sheet according to claim 5 or 7, wherein the core member is formed by joining the plurality of polypropylene resin foam boards having a different foaming extent and consisting of the plate body having a predetermined thickness.

9. The vehicle interior finishing laminate sheet according to claim 8, wherein the core member is configured so that the foaming extent of the polypropylene resin foam board disposed on a side end part side is lower than that of the polypropylene resin foam board disposed on a center side.

10. The vehicle interior finishing laminate sheet according to claim 5 or 7, wherein
   the core member is formed with an opening; and,
   the foaming extent of the polypropylene resin foam board disposed on a frame part side of the opening is lower than that of the polypropylene resin foam board disposed in any other part.

11. The vehicle interior finishing laminate sheet according to claim 7, wherein
the core member is formed by joining the plurality of polypropylene resin foam boards, each consisting of the plate body having a predetermined thickness, in the thickness direction; and,
the foaming extent of the polypropylene resin foam board disposed on an indoor side is lower than that of the polypropylene resin foam board disposed on an outdoor side.

12. The vehicle interior finishing laminate sheet according to claim 7, wherein the core member is formed by joining the polypropylene resin foam boards with each other on opposed joint faces, and wherein the polypropylene resin foam boards are formed with an undulation.

* * * * *